(12) United States Patent
Dani et al.

(10) Patent No.: US 10,125,027 B2
(45) Date of Patent: *Nov. 13, 2018

(54) LID FOR FILTER-AS-YOU-POUR CONTAINER SYSTEM

(71) Applicant: BRITA LP, Oakland, CA (US)

(72) Inventors: Nikhil P. Dani, Pleasanton, CA (US); Jonathan McDonald, Danville, CA (US); Nicole Doan, Danville, CA (US); Jonathan Taylor Wiegele, Venice, CA (US)

(73) Assignee: Brita LP, Oakland, CA (US)

( * ) Notice: Subject to any disclaimer, the term of this patent is extended or adjusted under 35 U.S.C. 154(b) by 67 days.

This patent is subject to a terminal disclaimer.

(21) Appl. No.: 15/038,982

(22) PCT Filed: Dec. 8, 2014

(86) PCT No.: PCT/US2014/069023
§ 371 (c)(1),
(2) Date: May 24, 2016

(87) PCT Pub. No.: WO2015/094739
PCT Pub. Date: Jun. 25, 2015

(65) Prior Publication Data
US 2017/0001880 A1    Jan. 5, 2017

Related U.S. Application Data

(63) Continuation-in-part of application No. 14/132,134, filed on Dec. 18, 2013.
(Continued)

(51) Int. Cl.
*C02F 1/00* (2006.01)
*C02F 1/28* (2006.01)
(Continued)

(52) U.S. Cl.
CPC ............ *C02F 1/003* (2013.01); *B01D 29/114* (2013.01); *B01D 35/30* (2013.01); *C02F 1/002* (2013.01);
(Continued)

(58) Field of Classification Search
CPC .......... C02F 1/002; C02F 1/003; C02F 1/283; C02F 2307/07; C02F 2201/006;
(Continued)

(56) References Cited

U.S. PATENT DOCUMENTS 313,320 A    3/1885    Goodale
1,074,168 A    9/1913    Feinstein
(Continued)

FOREIGN PATENT DOCUMENTS

EP    0402661 A1    12/1990
EP    0617951 A2    10/1994
(Continued)

OTHER PUBLICATIONS

Supplementary European Search Report EP 14872175.6, dated Jun. 8, 2017.
(Continued)

*Primary Examiner* — Terry K Cecil
(74) *Attorney, Agent, or Firm* — Thomas C. Feix

(57) ABSTRACT

The invention relates to lid bodies configured to be used in filter-as-you-pour systems, where filtering is achieved as the user pours water from the container. Such lid bodies may be releasably attachable to the filter assembly through complementary locking structures of the lid body and the filter assembly so that the lid body may be selectively and releasably attached to the filter assembly. The lid bodies may also comprise a locking structure that is configured to releasably engage with a complementary locking structure
(Continued)

of a container body. The lid bodies may also be configured to be directly connected to filter assemblies.

23 Claims, 18 Drawing Sheets

Related U.S. Application Data

(60) Provisional application No. 61/940,101, filed on Feb. 14, 2014.

(51) Int. Cl.
  *B67D 3/00* (2006.01)
  *C02F 1/42* (2006.01)
  *B01D 35/30* (2006.01)
  *B01D 29/11* (2006.01)
  *A47J 31/60* (2006.01)
  *C02F 101/20* (2006.01)
  *C02F 101/12* (2006.01)
  *C02F 103/06* (2006.01)

(52) U.S. Cl.
  CPC ............ *C02F 1/283* (2013.01); *C02F 1/42* (2013.01); *A47J 31/605* (2013.01); *C02F 2101/12* (2013.01); *C02F 2101/20* (2013.01); *C02F 2103/06* (2013.01); *C02F 2209/40* (2013.01); *C02F 2303/185* (2013.01); *C02F 2307/02* (2013.01); *C02F 2307/04* (2013.01)

(58) Field of Classification Search
  CPC ........ C02F 1/42; C02F 1/688; C02F 2307/04; C02F 2307/02; C02F 2101/12; C02F 2101/20; C02F 2103/06; C02F 2209/40; C02F 2303/185; A47J 31/605; B01D 29/114; B01D 35/30; B67D 2210/0001; B67D 3/0019; B67D 3/0051
  USPC .................. 210/464, 466, 467, 468, 469
  See application file for complete search history.

(56) References Cited

U.S. PATENT DOCUMENTS

| | | | |
|---|---|---|---|
| 2,689,048 A | 9/1954 | Powers | |
| 3,016,984 A | 1/1962 | Getzin | |
| 3,535,852 A | 10/1970 | Hirs | |
| 4,066,551 A * | 1/1978 | Stern .................. | B01D 61/18 210/282 |
| 4,096,742 A | 6/1978 | Musolf et al. | |
| 4,154,688 A | 5/1979 | Pall | |
| 4,605,499 A | 8/1986 | Wise | |
| 4,696,742 A | 9/1987 | Shimazaki | |
| 4,764,274 A | 8/1988 | Miller | |
| 4,948,499 A | 8/1990 | Peranio | |
| 4,983,288 A | 1/1991 | Karbachsch et al. | |
| 5,061,367 A | 10/1991 | Hatch et al. | |
| 5,076,922 A | 12/1991 | DeAre | |
| 5,106,501 A | 4/1992 | Yang et al. | |
| 5,225,078 A | 7/1993 | Polasky et al. | |
| 5,595,659 A | 1/1997 | Huang et al. | |
| 5,681,463 A | 10/1997 | Shimizu et al. | |
| 5,736,045 A | 4/1998 | Bies et al. | |
| 5,919,365 A | 7/1999 | Collette | |
| 5,980,743 A | 11/1999 | Bairischer | |
| 6,004,460 A | 12/1999 | Palmer et al. | |
| 6,189,436 B1 | 2/2001 | Brooks | |
| 6,193,886 B1 | 2/2001 | Nohren, Jr. | |
| 6,368,506 B1 | 4/2002 | Gebert et al. | |
| 6,383,381 B1 | 5/2002 | O'Flynn et al. | |
| 6,435,209 B1 | 8/2002 | Heil | |
| 6,565,743 B1 | 5/2003 | Poirier et al. | |
| 6,589,904 B1 | 7/2003 | Iwasaki et al. | |
| 6,599,427 B2 | 7/2003 | Nohren et al. | |
| 6,733,669 B1 | 5/2004 | Crick | |
| 7,473,362 B1 | 1/2009 | Nohren, Jr. | |
| 7,828,969 B2 | 11/2010 | Eaton et al. | |
| 8,051,989 B1 | 11/2011 | Tondreau | |
| 8,080,160 B2 | 12/2011 | Yanou et al. | |
| 8,133,525 B2 | 3/2012 | Skalski et al. | |
| 8,419,818 B2 | 4/2013 | Page | |
| 9,511,315 B2 | 12/2016 | Cur et al. | |
| 10,035,713 B2 | 7/2018 | Dani et al. | |
| 2002/0020673 A1 | 2/2002 | Nohren et al. | |
| 2002/0060176 A1 | 5/2002 | Mierau et al. | |
| 2002/0066700 A1 | 6/2002 | Dolfel et al. | |
| 2002/0083841 A1* | 7/2002 | Chaouachi ......... | A47J 27/21183 99/279 |
| 2002/0166811 A1 | 11/2002 | Walker et al. | |
| 2005/0279768 A1 | 12/2005 | Chatrath | |
| 2006/0144781 A1 | 7/2006 | Carlson et al. | |
| 2007/0007296 A1 | 1/2007 | Guyot | |
| 2008/0274312 A1 | 11/2008 | Schelling et al. | |
| 2009/0139926 A1 | 6/2009 | Hassebrauck | |
| 2009/0184042 A1 | 7/2009 | Steed et al. | |
| 2010/0170839 A1 | 7/2010 | Kohl | |
| 2010/0219151 A1 | 9/2010 | Risheq | |
| 2010/0266351 A1 | 10/2010 | Vogel et al. | |
| 2010/0282682 A1 | 11/2010 | Eaton et al. | |
| 2011/0079551 A1 | 4/2011 | Olson et al. | |
| 2011/0079572 A1 | 4/2011 | Olson et al. | |
| 2011/0247975 A1 | 10/2011 | Rapparini | |
| 2011/0303589 A1 | 12/2011 | Kuennen et al. | |
| 2011/0305801 A1 | 12/2011 | Beer | |
| 2012/0017766 A1* | 1/2012 | Anson .................. | B65D 47/12 99/290 |
| 2012/0055862 A1 | 3/2012 | Parekh et al. | |
| 2012/0061312 A1 | 3/2012 | Busick et al. | |
| 2012/0187036 A1 | 7/2012 | Risheq | |
| 2012/0193282 A1 | 8/2012 | Wolf et al. | |
| 2012/0214375 A1 | 8/2012 | Kitano et al. | |
| 2012/0255890 A1 | 10/2012 | Cumberland | |
| 2012/0298614 A1 | 11/2012 | Nelson | |
| 2012/0325735 A1 | 12/2012 | Dicks et al. | |
| 2013/0095212 A1 | 4/2013 | Beer | |
| 2013/0125748 A1 | 5/2013 | Taylor et al. | |
| 2013/0156897 A1 | 6/2013 | Goldstein | |
| 2013/0175228 A1 | 7/2013 | Utsch et al. | |
| 2013/0233890 A1 | 9/2013 | Melzer | |
| 2013/0319927 A1 | 12/2013 | Lin | |
| 2015/0166364 A1 | 6/2015 | Wiegele | |
| 2016/0167980 A1 | 6/2016 | Dani et al. | |
| 2016/0376161 A1 | 12/2016 | Dani et al. | |
| 2016/0376162 A1 | 12/2016 | Dani et al. | |
| 2016/0376163 A1 | 12/2016 | Dani et al. | |
| 2016/0376164 A1 | 12/2016 | Dani et al. | |
| 2016/0376165 A1 | 12/2016 | Dani et al. | |

FOREIGN PATENT DOCUMENTS

| | | | |
|---|---|---|---|
| GB | 2268680 A | 1/1994 | |
| GB | 2280596 A | 2/1995 | |
| JP | 657489 U | 8/1994 | |
| WO | PCT/US00/71468 A1 | 11/2000 | |
| WO | 2011145640 A1 | 11/2011 | |
| WO | 2012031853 A1 | 3/2012 | |
| WO | 2012150506 A2 | 11/2012 | |
| WO | 2013044079 A1 | 3/2013 | |
| WO | 2013083260 A1 | 6/2013 | |
| WO | WO-2014089207 A1 * | 6/2014 | ............ B01D 35/30 |
| WO | 2017055915 A1 | 4/2017 | |
| WO | 2017055918 A1 | 4/2017 | |

OTHER PUBLICATIONS

Supplementary European Search Report EP 14870910.8, dated Jun. 8, 2017.

Supplementary European Search Report EP 14871914.9, dated Jun. 13, 2017.

Supplementary European Search Report EP 14871701.0, dated Jun. 8, 2017.

(56) References Cited

OTHER PUBLICATIONS

Supplementary European Search Report EP 14871467.8, dated May 31, 2017.
Supplementary European Search Report EP 14871227.6, dated May 31, 2017.
CamelBak: "CamelBak Relay Water Pitcher," published Jan. 22, 2014, p. 1, XP054977371, Retrieved from the Internet: URL: https://www.youtube.com/watch?v=01TdZCF8AqY [retrieved on May 18, 2017].
NPL-1 ("Activated Carbon Filter Bags", Filterek) Date: Jun. 4, 2012.
Oxford Dictionary Definition—coextensive, 2017, 1 page.
Oxford Dictionary Definition—immediately, 2017, 1 page.

\* cited by examiner

LID FOR FILTER-AS-YOU-POUR CONTAINER SYSTEM

CROSS-REFERENCE TO RELATED APPLICATIONS

This application is the National Stage of International Application No. PCT/US2014/069023, filed Dec. 8, 2014, which claims the benefit under 35 U.S.C. 119(e) of U.S. Provisional Patent Application Ser. No. 61/940,101, filed Feb. 14, 2014. International Application No. PCT/US2014/069023, filed Dec. 8, 2014, is a continuation-in-part of U.S. patent application Ser. No. 14/132,134, filed Dec. 18, 2013. The disclosure of each of the above applications is incorporated by reference in its entirety.

BACKGROUND OF THE INVENTION

1. The Field of the Invention

The present invention is directed to filtered pour-through container systems, such as pitcher systems, where filtering is achieved as the user pours water from the container. More specifically, the present invention is directed to lids included with such systems.

2. Description of Related Art

Drinking water, such as water from water purification facilities or well water, can contain certain additives or contaminants (referred to herein collectively as contaminants) such as chlorine, chloramines or various organic components. Chlorine is typically intentionally added to water to control microbes. For some, chlorinated water imparts an unpleasant taste or smell. Its presence may also raise health concerns to some consumers.

Existing pour-through pitcher systems, such as those available from BRITA allow a user to fill a reservoir of the pitcher with water, which passes (under influence of gravity) through a filter, which removes contaminants from the water. The filtered water exits the filter into the main body of the pitcher, and may then be poured therefrom, providing filtered water for drinking.

One disadvantage of existing systems is that it may take several minutes for water introduced into the reservoir of such a system to be filtered, and ready for drinking. It would be beneficial to provide systems that might provide filtered water poured from a pitcher or other container where the time required to filter may be reduced.

BRIEF SUMMARY

The present invention is directed to filter-as-you-pour systems for holding and filtering water, as the water is dispensed. In this way, users can be provided with water that is filtered as the water is poured.

In an embodiment, the present invention is directed to a filter-as-you-pour system. The system comprises a container body defining an internal storage volume, a lid body that is releasably attachable over the container body, an inlet through which unfiltered water may be introduced into the container body, an outlet for water to flow out of the system, and a filter assembly. The lid body is advantageously releasably attachable to the filter assembly through complementary locking structures of the lid body and the filter assembly so that the lid body may be selectively and releasably attached to the filter assembly. The filter assembly that is attachable to the lid body is disposed so as to be in a flow stream of the water only as the water is poured out of the container body through the outlet. As a result, the stream of water exiting through the outlet is filtered as it is poured from the container body, so that all water exiting through the outlet passes through the filter assembly before exiting through the outlet. Such a system allows water to be introduced directly into the container body (e.g., through the inlet) without first flowing through a filter or reservoir, and the water is filtered as it is poured through the outlet.

In another embodiment, a filter-as-you-pour system comprises a container body defining an internal storage volume, a lid body, and a filter assembly. The lid body may be releasably attachable to the container body, and may comprise an outlet through which filtered water is poured out of the container body, and an inlet through which water is introduced into the container. The lid body may be configured so that water introduced into the container body through the inlet flows directly into the container without first flowing through a filter or a reservoir. The lid body and the container body may advantageously respectively comprise complementary locking structures configured to releasably engage one another so that the lid body may be selectively and releasably attached to (e.g., over) the container body. The filter assembly may be configured to releasably attach to the lid body around the outlet of the lid body. In this way, all water flowing through the outlet first passes through the filter assembly before passing through the outlet.

In another embodiment, a filter-as-you-pour system comprises a container body defining an internal storage volume, a filter assembly, and a lid body that is directly attachable to the filter assembly. The lid body may comprise an outlet through which filtered water is poured out of the container body, and an inlet through which water is introduced into the container body. The lid body and system may be configured so that water flows directly into the container body without first flowing through a filter or a reservoir. In addition, because the filter assembly that is directly attachable to the lid body may be disposed about the outlet so that all water flowing through the outlet passes through the filter assembly before passing through the outlet.

Further features and advantages of the present invention will become apparent to those of ordinary skill in the art in view of the detailed description of preferred embodiments below.

BRIEF DESCRIPTION OF THE DRAWINGS

To further clarify the above and other advantages and features of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

I. Definitions

Figure 1:
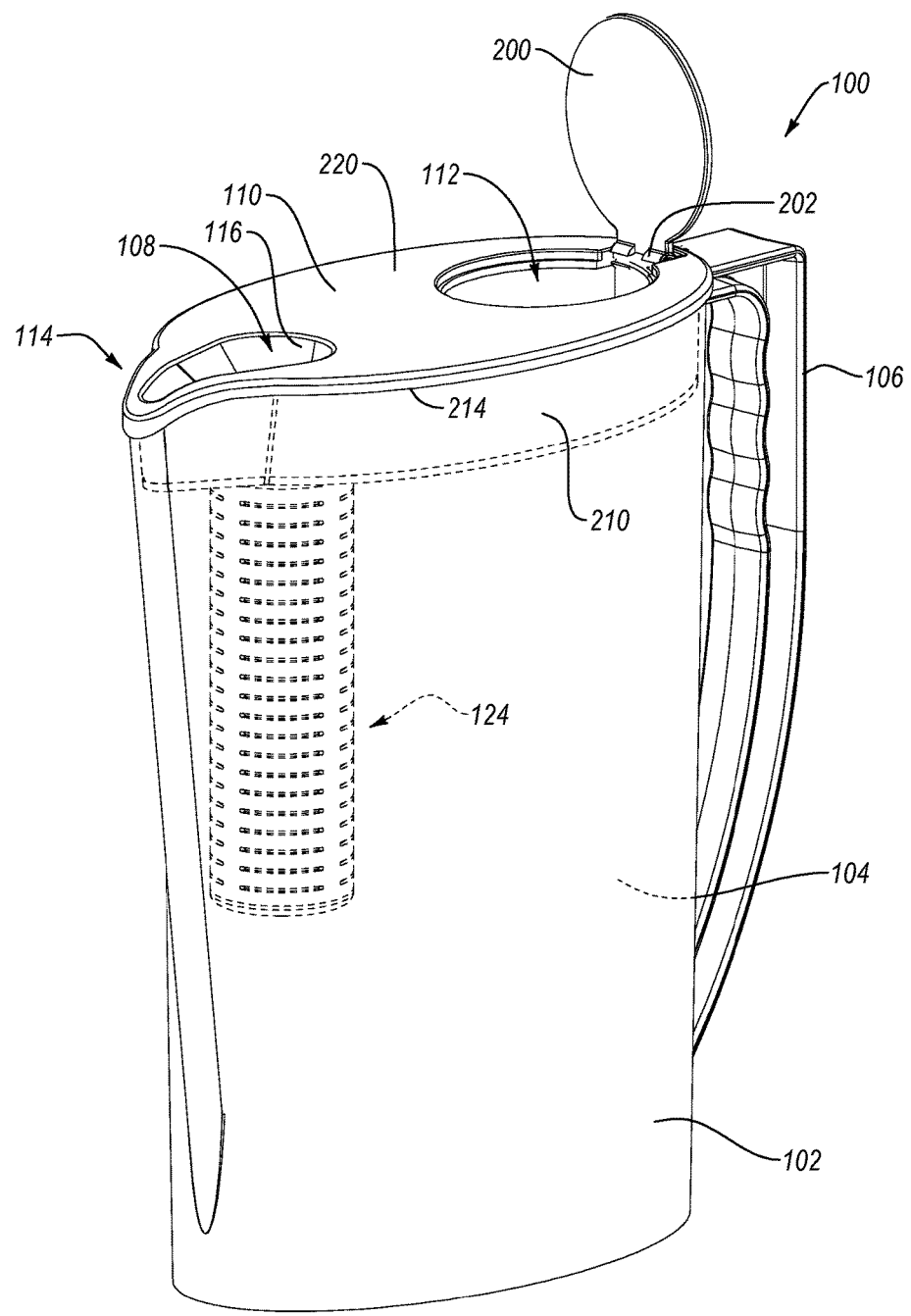
FIG. 1 is a perspective view of an embodiment of an exemplary filter-as-you-pour system.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an", and "the" include plural referents unless the content clearly dictates otherwise. Thus, for example, reference to a "surfactant" includes one, two or more surfactants.

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Various aspects of the present devices, systems, and methods may be illustrated with reference to one or more exemplary embodiments. As used herein, the term "exemplary" means "serving as an example, instance, or illustration," and should not necessarily be construed as preferred or advantageous over other embodiments disclosed herein.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentages ("wt %'s") are in wt % (based on 100 weight % active) of the particular material present in the referenced composition, any remaining percentage typically being water or an aqueous carrier sufficient to account for 100% of the composition, unless otherwise noted. For very low weight percentages, the term "ppm" corresponding to parts per million on a weight/weight basis may be used, noting that 1.0 wt % corresponds to 10,000 ppm.

II. Introduction

The present disclosure is directed to gravity-fed water filtration container systems which may advantageously provide for faster flow rates of the water through the filter assembly of the system, allowing unfiltered water to be filtered as it is poured from the container of the system (i.e., a filter-as-you-pour system).

Such a system may include a container body defining an internal storage volume, and a container outlet through which water within the container body may be poured and simultaneously filtered. The system may further include a lid that may be releasably attachable over the container body (e.g., a pitcher body), and a filter assembly attachable to at least one of the lid or the container body. The filter assembly may be disposed so as to be in a flow stream of the water, as the water is poured out of the container body through an outlet of the system, so that the stream of water exiting through the outlet is simultaneously filtered as it is poured from the container body.

III. Exemplary Lids for Filter-as-You-Pour Systems

FIG. 1 shows an embodiment of an exemplary filter-as-you-pour system 100. The system 100 may include a container body 102. The container body 102 defines an internal storage volume 104 for holding filtered or unfiltered water. The internal storage volume 104 is preferably at least about 300 mL, and may be several liters. The container body may be a pitcher, carafe, thermos, water bottle, canteen, jug, flask, flagon, ewer, decanter, jar, or glass, for example. As shown, container body 102 may include a handle 106 to aid in pouring water disposed within storage volume 104 out an outlet 108 of system 100.

The system comprises a lid body 110 that is releasably attachable over the container body 102. The system also comprises an outlet 108 for water to flow out of the system. The system also comprises an inlet 112 through which water, which may be unfiltered water, may be introduced into the container body 102. The outlet 108 and inlet 112 may be formed in the lid body 110. For example, the lid body 110 may comprise an outlet 108 through which filtered water is poured out of the container body 102 and an inlet 112 through which water is introduced into the container body 102. The inlet 112 may be covered by an inlet cover 200. The inlet cover 200 may be attached to the lid body 110 by a hinged joint 202. As perhaps best seen in FIG. 5, the inlet cover 200 may have a raised lip 206 which can be used to lift the inlet cover 200 (e.g., by pressing the thumb into the illustrated concave depression of lip 206, causing cover 200 to pivot about hinge 202).

The lid body 110 and the container body 102 may comprise respective sets of complementary locking structures configured to releasably engage one another so that the lid body 110 may be selectively and releasably attached to the container body 102. Friction fits between the two components, or any of various lock and key type locking structures may be employed, e.g., so as to ensure that lid 110 does not inadvertently fall off of container body 102.

As illustrated in FIG. 1, container body 102 may be configured as a pitcher, e.g., including a spout 114, adjacent outlet 108. Spout 114, as illustrated, may be defined by structures in both container body 102 and lid 110. For example, container body 102 is shown as including a portion which tapers towards spout 114. Similarly, lid 110 is shown as including a corresponding cross-sectional shape, also being tapered at the portion corresponding to spout 114, so that lid 110 fits into the open top of container body 102. In addition, lid 110 is shown as including flared portion 116 adjacent outlet 108, providing a surface which slopes downward from a top of lid 110 to outlet 108. As a result, flared portion 116 defines a larger opening adjacent the top of lid 110, which slopes downward, much like a flared funnel, towards outlet 108.

In FIG. 1, outlet 108 is shown as being disposed somewhat proximal relative to the spout 114 from which water exits the system, so that water exiting outlet 108 will flow along the tapered spout portion 118 of lid 110, until it reaches the extreme end of tapered spout portion 118, and exits the system 100 (e.g., into a glass, other container, etc.).

In some embodiments, the system 100 or lid body 110 may include a flow control device (e.g., a valve, grating, screen, etc.) disposed proximate (e.g., in or over) the outlet 108 to regulate an exit flow rate of water being poured through the outlet. Additional details of such embodiments are disclosed in Application No. 15/039,002, filed the same day as the present case and herein incorporated by reference in its entirety.

The system comprises a filter assembly 124 which may be attachable to the lid body 110, the container body 102, or both the lid body 100 and container body 102. The filter assembly 124 is configured to remove contaminants from the water. The filter assembly 124 may be disposed so as to be in a flow stream of the water only as the water is poured out of the container body 102 through the outlet 108. This is done so that the stream of water exiting through the outlet 108 is filtered as it is poured from the container body 102. The filter assembly 124 may be directly attachable to the lid body 110 (e.g., through a threaded or other connection) and disposed about the outlet 108 so that all water flowing through the outlet 108 first passes through the filter assembly 124.

All water exiting through the outlet 108 passes through the filter assembly 124 before exiting through the outlet 108. In order for this to occur, the filter assembly 124 may be configured to releasably attach to the lid body 110 around the outlet 108 of the lid body 110 so that the only way water can access the outlet 108 is by passing through the filter assembly 124. In an embodiment, the lid body 110 and system 100 may be configured so that water introduced into the container body 102 through the inlet 112 flows directly into the container body 102 without first flowing through a filter or a reservoir. In another embodiment, a filter may be disposed proximate inlet 112, so that water is filtered both on entry and exit. In one such an embodiment, the inlet and outlet may be one and the same (i.e., the filter assembly may be a dual pass filter assembly, so that the water passes therethrough on entry and again on exit).

The lid body 110 may be releasably attachable to the filter assembly 124 through complementary locking structures of the lid body 110 and the filter assembly 124 so that the lid body 110 may be selectively and releasably attached to the filter assembly 124. The lid body 110 may be directly attachable to the filter assembly 124. In another embodiment, there may be intervening structure between the filter assembly and the lid body.

Figure 3:
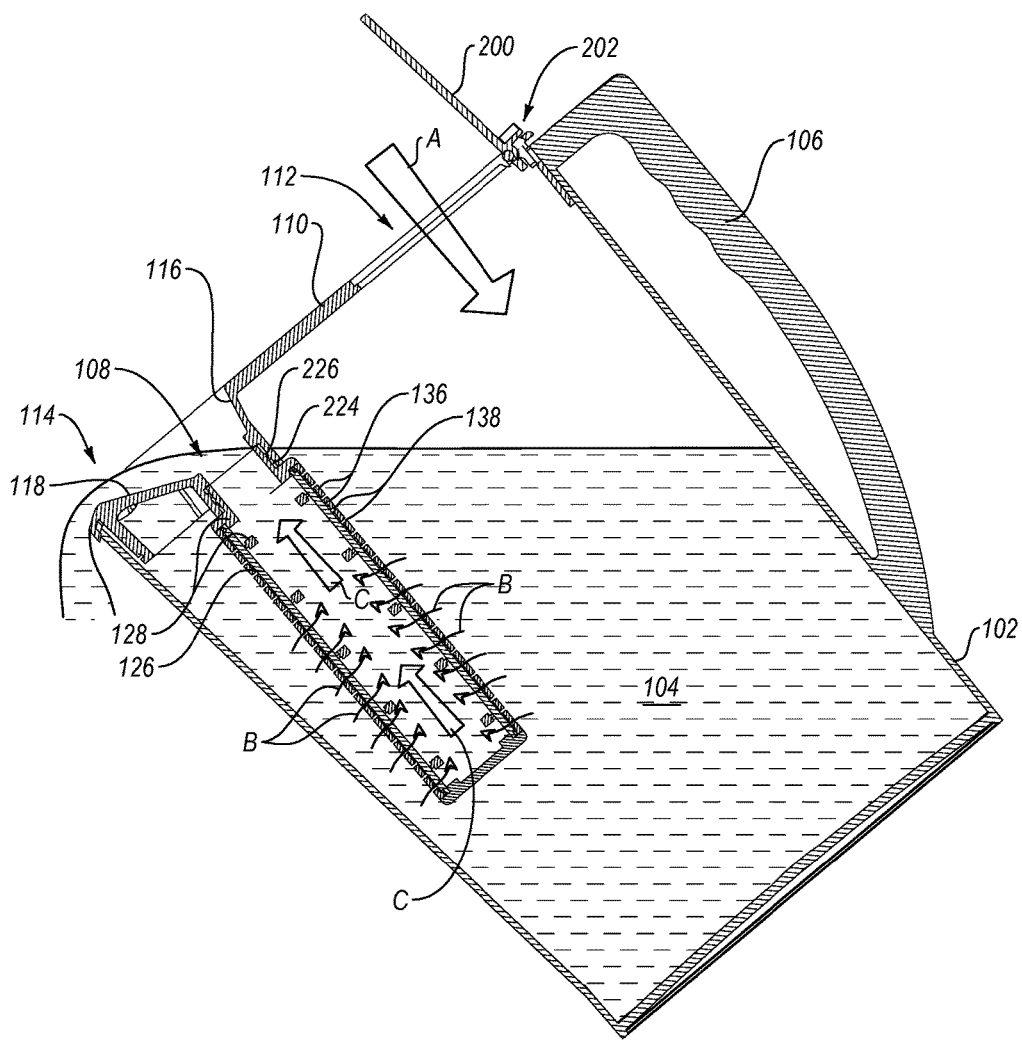
FIG. 3 is a cross-sectional schematic view of the embodiment of the filter-as-you-pour system of FIG. 1, showing the flow of water in and out of the system.
Figure 9A:
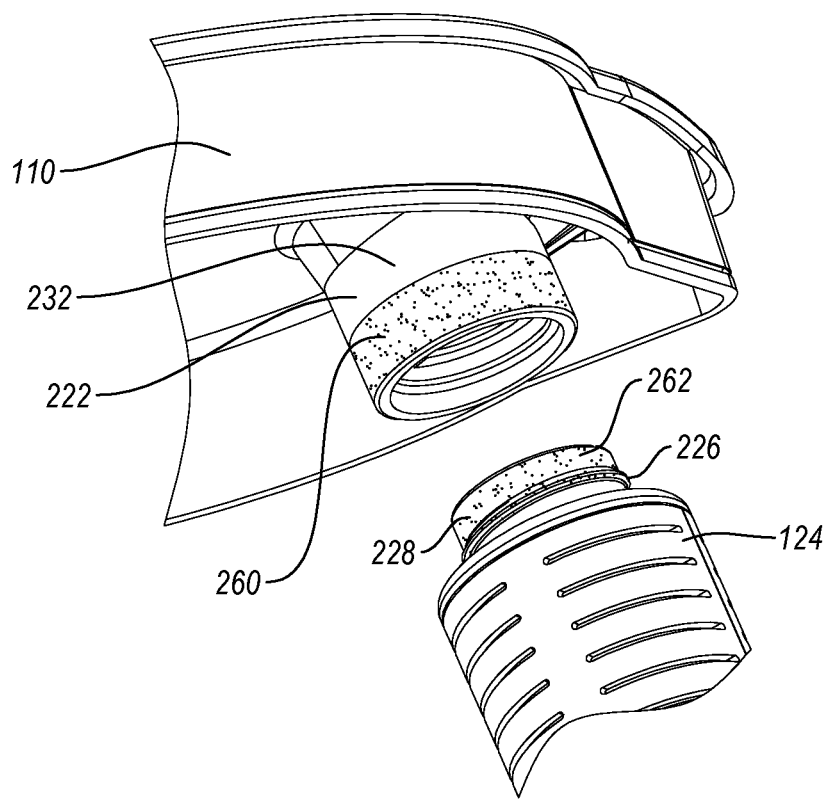
FIG. 9A is a perspective view of another embodiment of a lid body and associated filter assembly.
Figure 9B:
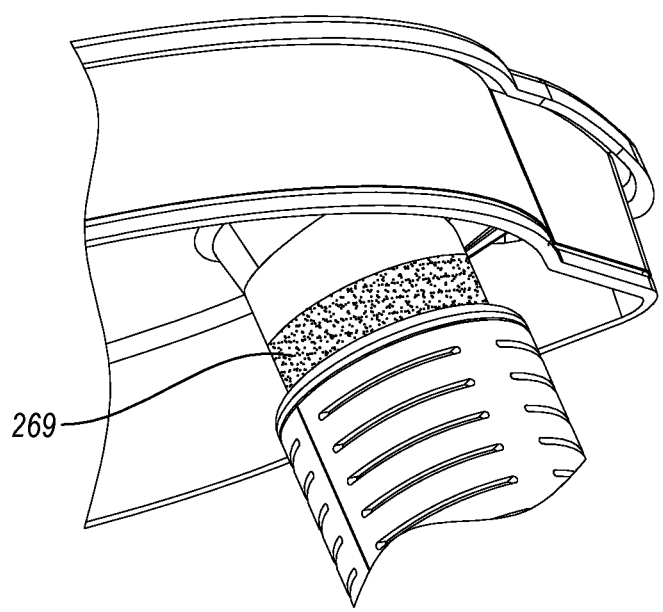
FIG. 9B illustrates the lid body and filter assembly of FIG. 8A joined together.

Filter assembly 124 may be releasably attachable to lid 110 through a thread and groove structural arrangement, e.g., so that assembly 124 may screw into lid 110, around or within outlet 108. FIGS. 3, 9A, and 9B illustrate such a configuration, and are described in further detail below.

Figure 2A:
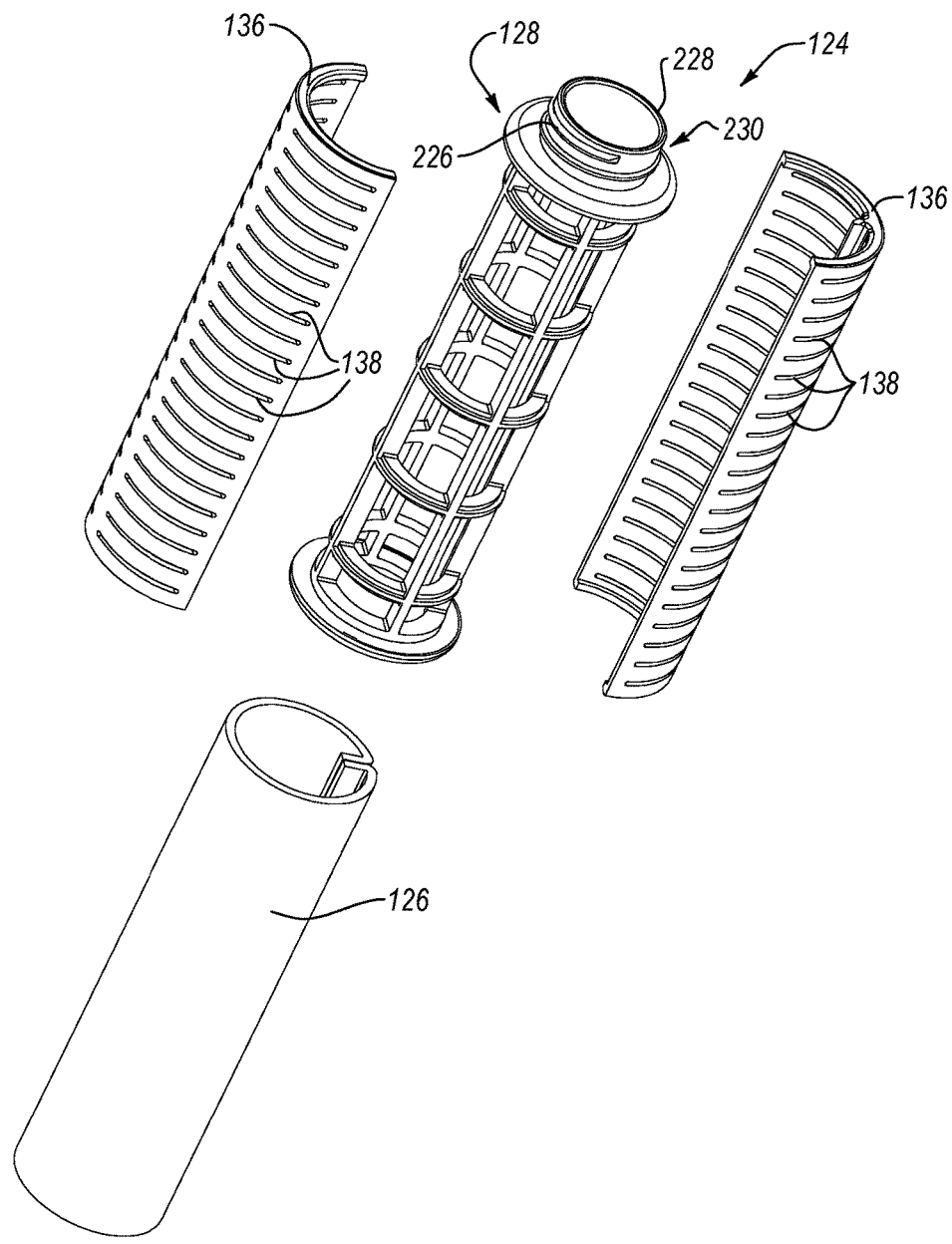
FIG. 2A is an exploded view of an exemplary embodiment of a filter assembly.
Figure 2B:
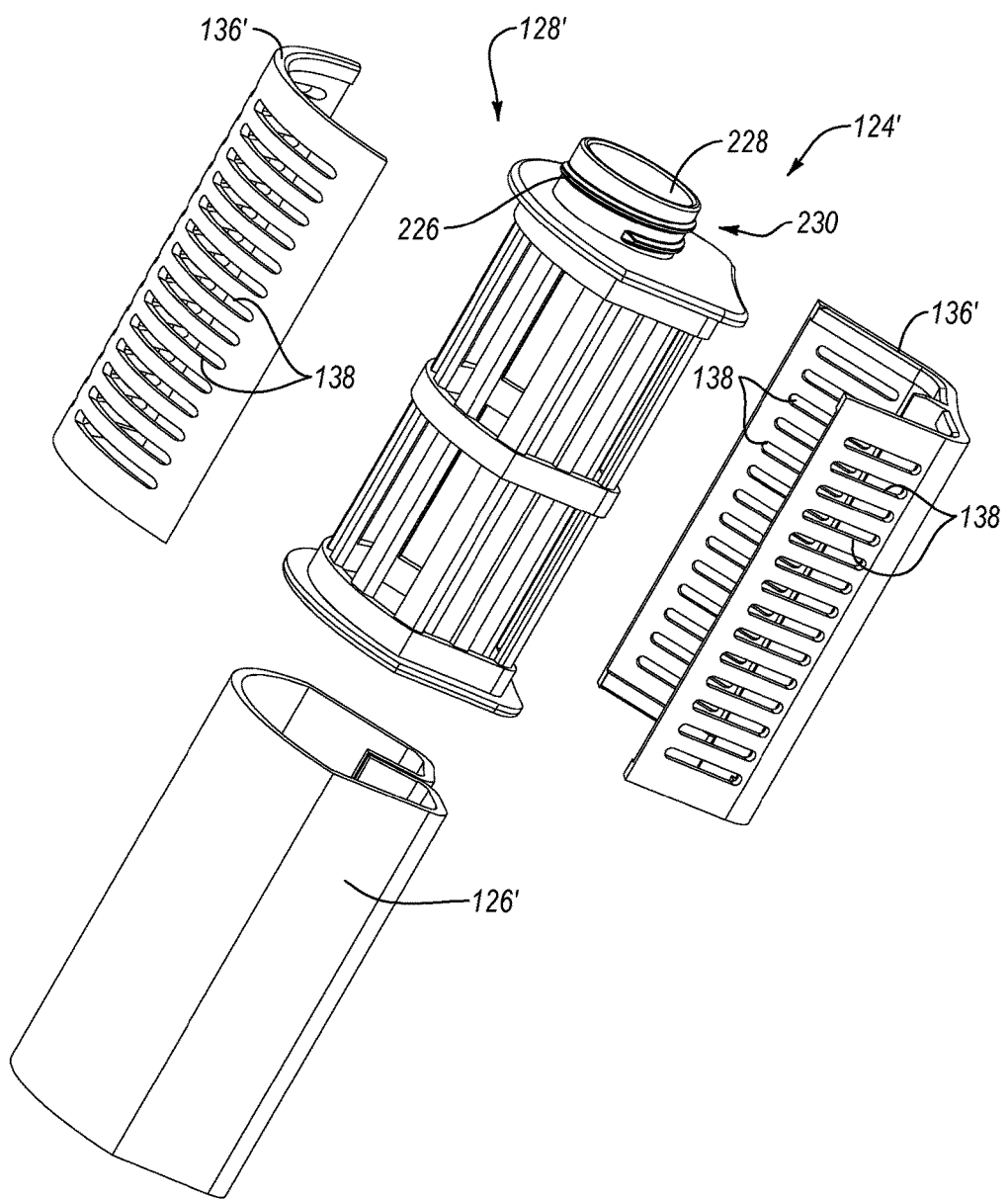
FIG. 2B is an exploded view of another exemplary embodiment of a filter assembly.

As shown in FIGS. 2A and 2B, the filter media 126 of the filter assembly 124 may comprise an activated carbon textile material that presents a curved surface to the flow stream of water. The filter assembly 124 may comprise a gravity flow filter. The activated carbon textile material 126 may be wrapped around a core frame member 128 of the filter assembly 124, so that the flexible, fibrous textile material presents a curved surface to water entering the filter assembly 124. A casing or shell 136 may be disposed about core frame member 128, sandwiching textile material 126 between shell 136 and core frame member 128. As shown, shell 136 may include slots 138 disposed therein, so as to allow water to be filtered by assembly 124 to enter filter assembly 124. With respect to structure 136 and similar structures, the terms casing and shell may be interchangeably employed.

FIG. 2B illustrates another filter assembly configuration 124', where the front face of filter assembly 124' is curved. It will be readily apparent that various filter assembly configurations may be employed. The filter assembly 124' has a core frame member 128', textile filter media material 126', and casing or shell 136' with slots 138.

The textile material 126 may be formed from structural elements selected from the group consisting of fibers, yarns, filaments, flexible porous composites, combinations thereof, etc., which may be woven, non-woven, braided, or otherwise joined into a textile material. Such textile materials may typically be comprised of relatively high aspect ratio structural elements whose length is orders of magnitude (e.g., 1-5 orders of magnitude) larger than the diameter.

Such textile materials also may have varying degrees of structural integrity based on the amount, size, and distribution of the structural elements. For example some textile structures may have the structural elements loosely held generally parallel to each other while in other embodiments the structural elements may be twisted around a longitudinal axis or they may be interlaced orthogonally relative to each other or they may be randomly oriented relative to each other. The physical dimensions and orientation of the structural elements of the textile material also create a depth to thickness ratio for the resulting textile material, along with pores of various sizes.

For best use in water filtration applications these textile materials preferably may have an optimal combination of thickness and pore size distribution to not only allow water to flow at the desired flow rate, but also contain enough mass of material to enable desired levels of contaminant reduction, while having enough physical integrity to prevent the structural elements the textile material is made of from being dislodged by the water penetrating through it.

By way of non-limiting example, a textile material employed as filter media 126 may have properties as shown in Table 1 below.

TABLE 1

| Property | Specification |
| --- | --- |
| Basis Weight | 25-200 g/m$^2$ |
| Thickness | 0.5-5.0 mm |
| Iodine Number | 500-3000 mg/g |
| Pore size distribution (avg.) | 5-1000 μm |
| Fiber diameter (avg.) | 1-50 μm |

Additional details of exemplary filter assemblies, including filter media and filter housings are disclosed in Application Ser. Nos. 14/569,397; 15/038,996; and 15/038,998, each filed the same day as the present application and each herein incorporated by reference in its entirety.

As shown in FIG. 3, the filter assembly embodiments shown in FIGS. 2A and 2B are designed so that water flows into the filter assembly 124 from the container body 102 in a radial direction, as represented by arrows B, and flows out towards the outlet 108 in an axial direction, as represented by arrows C. Filter assembly 124 is shown as being generally cylindrical, and filter assembly 124' is shown as providing a curved crescent shaped front surface, and shares the radial flow upon entrance and axial flow upon exit characteristics of filter assembly 124 of FIG. 2A. It will be appreciated that other configurations for the filter assembly may also be employed. In particularly preferred embodiments, the filter assembly includes the described textile material filter media, which is arranged so as to present a curved surface to the incoming flow of water. Such arrangements have surprisingly and unexpectedly been found to provide relatively high flow rates, making a filter-as-you-pour implementation possible from a practical perspective.

The filter assembly may be configured to filter unfiltered water within container body 102 as it is poured therefrom, while at the same time providing a flow rate of water through outlet 108 that is at least about 0.3 gallons per minute (GPM). In other words, the filter-as-you-pour system may be configured to provide a minimum flow rate of 0.3 GPM. In another embodiment, the filter-as-you-pour system may be configured to provide a minimum flow rate of 0.5 GPM. In an embodiment, the filter assembly is advantageously configured to provide and allow for exit flow rates of filtered water from about 0.3 GPM to about 2 GPM, from about 0.3 GPM to about 1 GPM, or from about 0.5 GPM to about 0.8 GPM. Such flow rates are typically not possible with filter assemblies including particulate or granulated filter media typically employed in gravity-fed water filtration systems that include a reservoir into which unfiltered water is introduced, which water then trickles through the filter assembly and into the container body (e.g., pitcher), where it can then be poured therefrom. For example, filter assemblies based on such filter media typically require 3 to 8 minutes to filter 1 liter of water (e.g., corresponding to a flow rate of 0.03 GPM to 0.09 GPM).

The filter assemblies employed in the present invention may advantageously provide for much faster filtration flow rates, such as those above. In an embodiment, the filter media of the filter assembly comprises an activated carbon textile material (i.e., fibrous), which textile material presents a curved surface to the flow stream of water. Such textile materials disposed so as to present a curved surface to the flow stream of water have surprisingly been found to provide and allow for significantly faster flow rates as compared to the 3 to 8 minutes required to filter 1 liter of water provided by other filter media.

FIG. 3 illustrates an exemplary flow path along which the water may pass as it moves through system 100. Water may be introduced into container body 102 through inlet 112 in lid 110, as depicted by arrow A. As shown, advantageously, no filter may be disposed between inlet 112 and storage volume 104, so that unfiltered water may be quickly introduced into container body 102, without any delay associated with a filter disposed between inlet 112 and storage volume 104. Rather than filtering upon entering container body 102, at least some embodiments of the present invention provide for filtering of the water only as it exits through outlet 108. Of course, some embodiments may provide filtering upon entrance and exit, although overall faster flow rates may be possible where filtering is limited to passage through the outlet 108.

When a user tips a pitcher or other container body 102 (e.g., as depicted in FIG. 3), the water may flow into filter assembly 124 along a radial flow path as depicted by arrows B, through one or more layers of textile material filter media 126, which advantageously is disposed so as to present a curved, rather than perpendicular or planar surface to the stream of water. By positioning textile material filter media 126 so that at least a portion thereof presents a curved, rather than planar surface, the inventors have surprisingly found that flow rates through the filter media are significantly increased. Once the water passes through layer(s) 126, the filtered water may then flow axially, as represented by arrows C, up towards outlet 108. The filtered water may pass through any flow control device (e.g., a slit valve, grating, etc.) disposed in outlet 108, and over spout portion 118 of lid 110.

Described another way, the filter assembly 124 is configured so that when water passes from storage volume 104 towards outlet 108, the inlet thereto (e.g., slots 138) is disposed about the perimeter of filter assembly 124, while the outlet is aligned with the longitudinal axis of filter assembly 124. Because slots 138 provide a relatively high surface area along which water may enter and penetrate through textile material 126, a high flow rate of water through assembly 124 is possible. The filtered water (having passed through filter media 126) is collected in the central hollow section of core frame 128, and then exits axially towards outlet 108.

In an embodiment, characteristics of textile filter media material 126 may serve to alter the flow characteristics of the stream of water exiting the system, e.g., in combination with any flow control device disposed proximate the outlet 108. For example, in an embodiment, the filter media 126 may comprise a single layer of activated carbon fibrous textile (e.g., felt) material.

In another embodiment, a second layer may be provided, so that the filter media comprises two layers of activated carbon textile material (e.g., two layers, each about 0.75 mm to about 1 mm in thickness). Similar results may be achieved by increasing the thickness of a single textile layer (e.g., about 1.5 mm to 2 mm rather than a 0.75 mm to 1 mm thick single layer). Providing two layers of textile filter media material 126 (or a thicker single layer) may reduce the flow rate of water through the system as compared to a single layer of a given thickness.

Use of two layers may also increase the filtration effectiveness characteristics (e.g., a higher fraction of removed chlorine), or increase life (e.g., gallons filtered before recommended filter replacement). For example, use of two layers may flatten the curve resulting from a plot of chlorine removal verses gallons filtered (see FIG. 10), providing increased consistency over the life of the filter. In addition, the second layer may be differently configured relative to the first layer, so as to remove different contaminants. For example, a second layer may comprise an ion exchange resin (IER) in fibrous, textile (e.g., felt) form, so as to be disposed within filter assembly 124 in a similar manner as the activated carbon textile material 126, but capable of removing heavy metal contaminants (e.g., copper, cadmium, mercury, lead, etc.).

The filter media textile material 126 is fibrous, e.g., fibers, filaments, or other structural elements of the material may be matted, woven, braided, or otherwise joined together. Such a fibrous material exhibits very high porosity characteristics, and in combination with the large inlet surface area provided by slots 138, allows and provides for the relatively high flow rates of water therethrough, as described herein. Such porosity and associated flow rate characteristics are not possible with traditionally employed filter media, such as monolithic activated carbon block, a bed of activated carbon granules or particles.

Although filtering foam filter media may offer gravity fed flow rates therethrough that are higher than those possible with granulated or monolithic activated carbon, such foam filter systems are not particularly efficient in removing chlorine or other contaminants. For example, more foam material is required to achieve a desired target removal efficiency. For example, foam media may remove only about ⅓ as much chlorine in a single pass under typical use conditions. As a result, products relying on filtration using a foam filter media pass the water through the foam filter media both upon entry and exit from the container in order to achieve an acceptable level of contaminant removal efficacy. Employing the fibrous activated carbon textile material as described herein advantageously is capable of achieving contaminant removal efficacy (e.g., at least 80%, at least 85%, at least 90%, at least 95%, or at least 99% chlorine removal) that is comparable to that achieved by products employing monolithic or granulated activated carbon filter media (e.g., about 3 times greater than that provided by foam), but at flow rates that are significantly higher (e.g., at least about 0.3 GPM) than granulated activated carbon, which makes practical implementation of a filter-as-you-pour container system possible.

Stated another way, the filter-as-you-pour systems of the present invention employ a textile filter media material arranged so as to present a curved surface to inflowing water to be filtered. The configurations allow for relatively compact filter assemblies capable of providing performance equivalent or similar to larger (e.g., greater surface area of filter media) or multi-stage systems. The filter-as-you-pour system places textile filter media material in the path of water flowing out from the container body under gravity-flow conditions. Under such conditions, with a known porous filter material constant bulk density, Darcy's law applies:

$$k = \frac{QL\mu}{\rho g A \Delta P}$$

| Symbol | Variable | Typical Units Metric (English) | Typical Operating Range |
|---|---|---|---|
| k | Intrinsic Permeability | cm/s (ft/s) | $1.2 \times 10^{-7}$-$3.7 \times 10^{-4}$ ($4 \times 10^{-9}$-$1.2 \times 10^{-5}$) |
| Q | Flow Rate | L/min (gal/min) | 0.75-7.5 (0.2-2.0) |
| L | Path Length | cm (in) | 0.1-0.5 (0.04-0.2) |
| μ | Dynamic Viscosity | g/cm-s (lbf/ft-s) | 0.9-1.4 (0.06-0. |
| ρ | Fluid Density | g/cm$^3$ (lb/ft$^3$) | 1.00 (62.4) |
| G | Gravity Acceleration | cm/s$^2$ (ft/s$^2$) | 980.665 (32.174) |
| A | Surface Area | cm2 (ft$^2$) | 50-650 (0.05-0.60) |
| ΔP | Pressure Differential | cm H$_2$O (lb/in$^2$) | 5-15 (0.07-0.22) |

Figure 10:
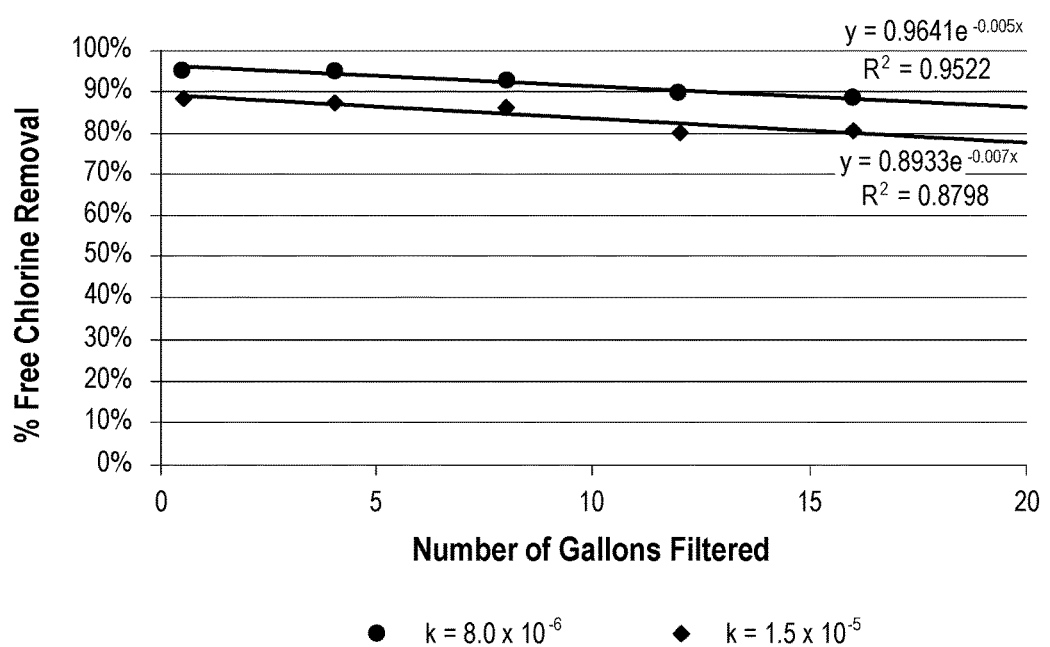
FIG. 10 is a graph illustrating how free chlorine removal may decrease with increasing throughput.

For a given filter material density and associated permeability, the removal efficiency for a given water contaminant (e.g., chlorine) can be related directly to the mass load of that constituent over time. For a constant influent concentration (e.g., the unfiltered water maintains the same chlorine concentration), removal efficiency can be related to total flow throughput. For a first-order reaction, such as that characteristic of free chlorine degradation on activated carbon, this follows an exponential curve. As permeability increases, contaminant removal decreases. The filter-as-you-pour configuration and textile filter media material described has the advantage of providing higher contaminant removal efficiency at higher permeability than alternative methods. Because of these advantages, this allows relatively smaller filtration assemblies, and/or better removal efficiencies. FIG. 10 illustrates exemplary contaminant removal profiles for two different permeability values over a portion of the life of a filter assembly.

Such filter assemblies may have a life of at least about 20 gallons, at least about 30 gallons, at least about 40 gallons, from about 40 to about 80 gallons, etc. At the end of its life the filter assembly may still achieve chlorine removal of at least 60%, at least 70%, or at least 75%. The filter assemblies may meet applicable NSF/AISI 42 standards. As shown in FIG. 10, the contaminant removal efficiency may be relatively consistent over the life of the filter assembly (e.g., within ±30%, within ±25%, within ±20%, within ±10%, or within ±5% of a lifetime average removal efficiency).

The filter assembly 124 of FIG. 3 is shown as attached to lid 110 (e.g., through any suitable releasable attachment mechanism, such as the illustrated threaded connection). In another embodiment, the filter assembly may be releasably attached to or associated with the container body of the system. An example of such a configuration is disclosed in Application Ser. No. 15/039,002 filed the same day as the present application and herein incorporated by reference in its entirety.

Figure 4A:
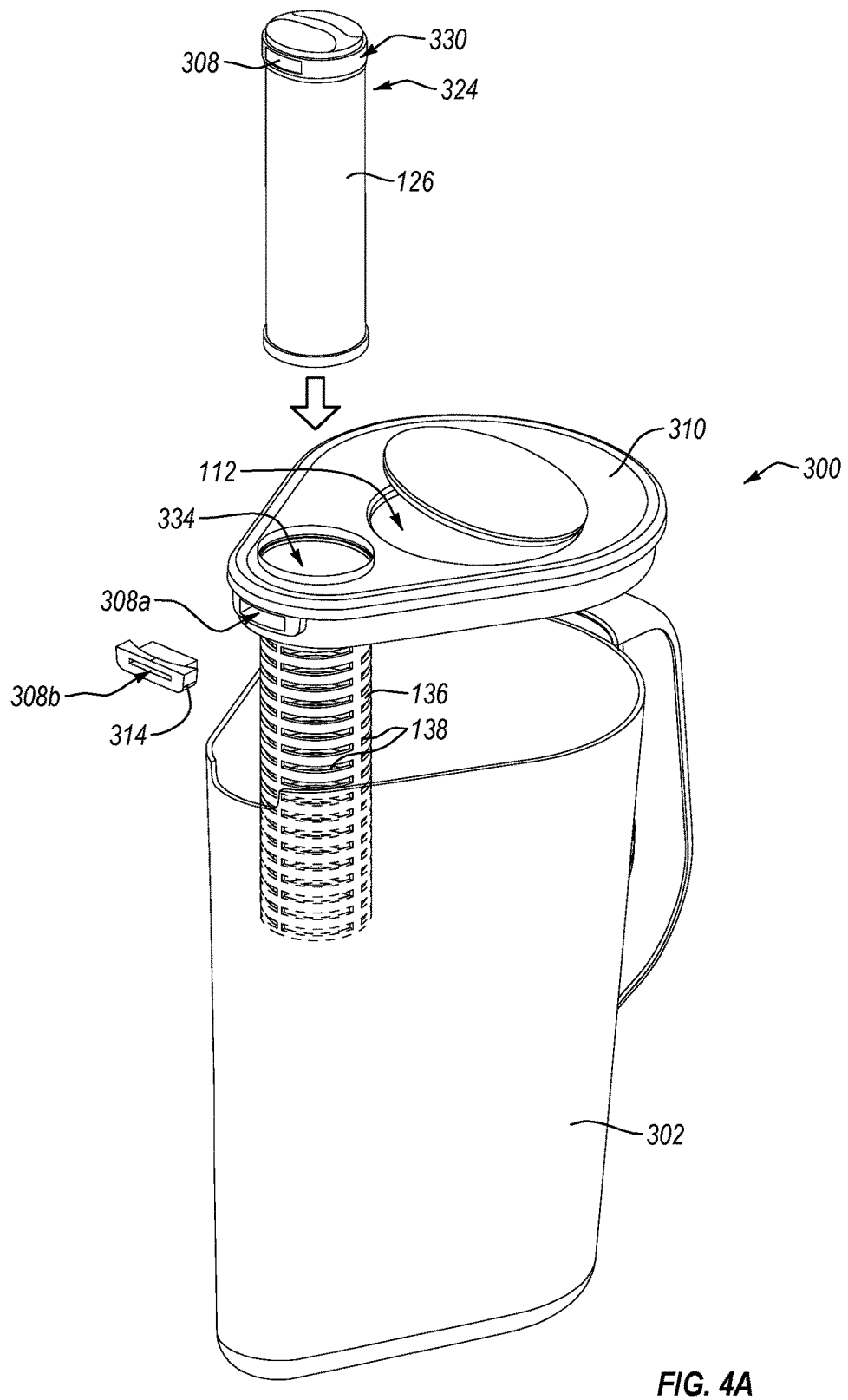
FIG. 4A is an exploded perspective view illustrating another exemplary embodiment of a filter-as-you-pour system.
Figure 4B:
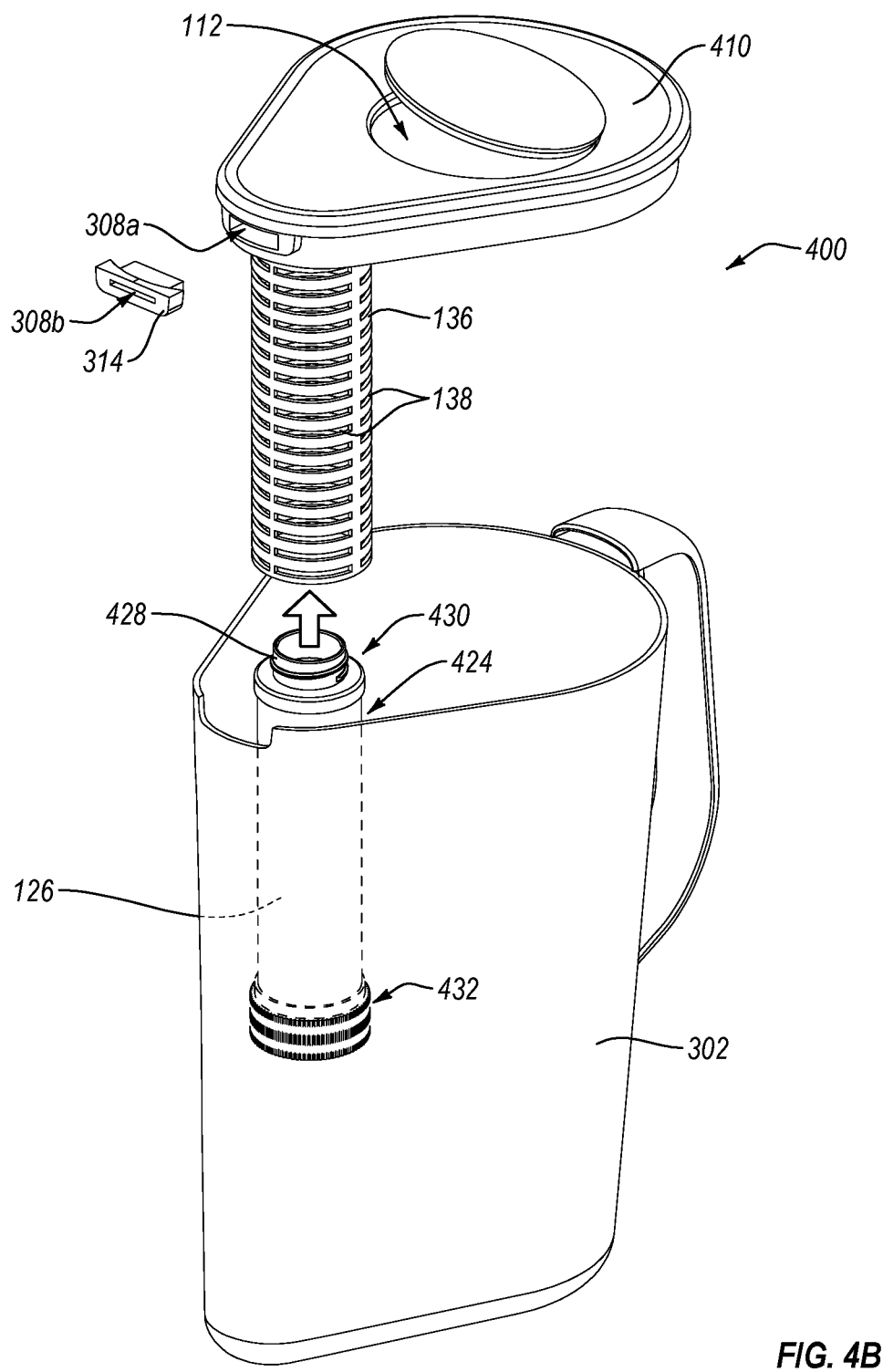
FIG. 4B is an exploded perspective view illustrating another exemplary embodiment of a filter-as-you-pour system.
Figure 4C:
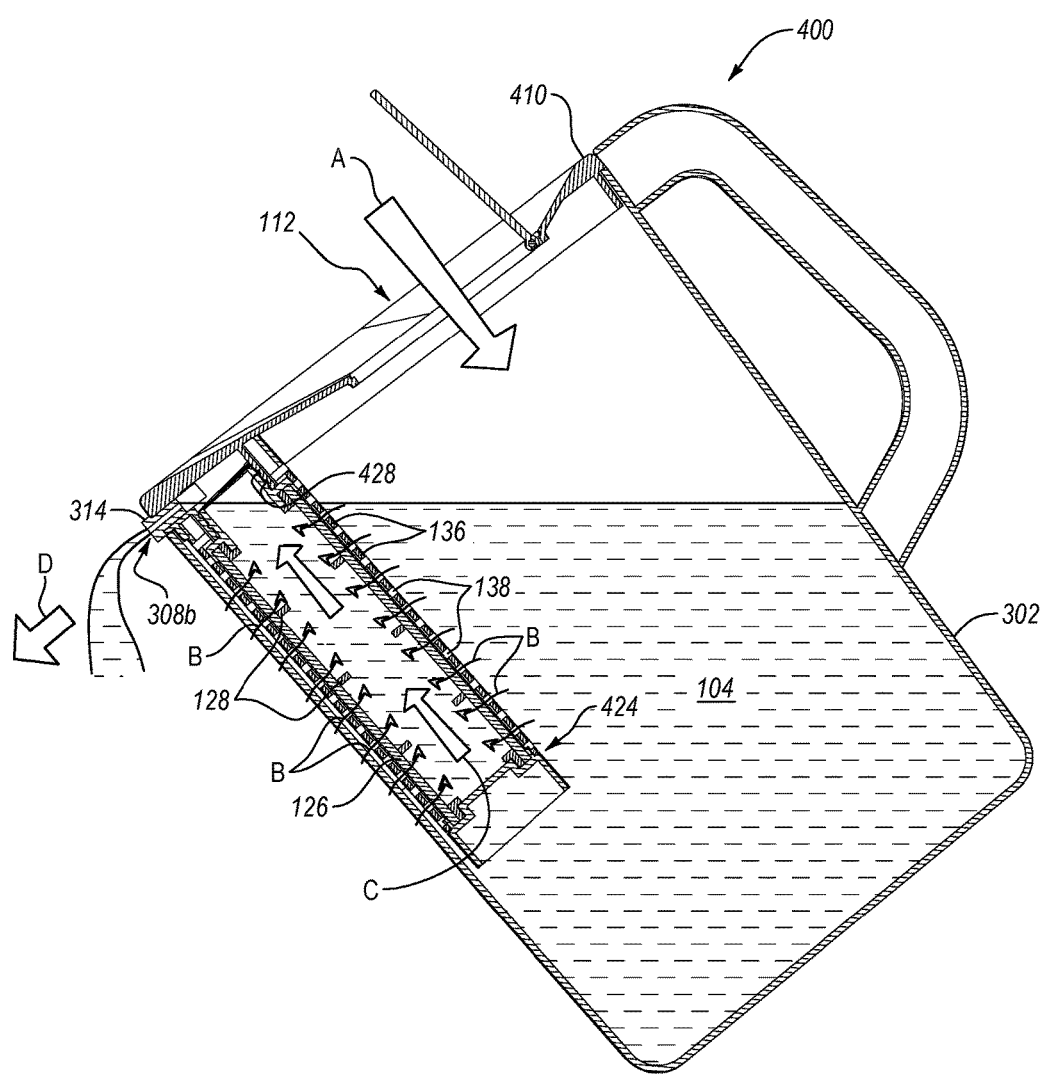
FIG. 4C is a cross-sectional schematic view through an assembled filter-as-you-pour system similar to that of FIG. 4B, showing the flow of water in and out of the system.

FIGS. 4A-4B illustrates an exemplary configuration where the filter assembly may be inserted from the top down, or from the bottom up, respectively. Both configurations shown in FIGS. 4A-4B include a particular lid and spout configuration that permit exiting water to flow out of the system in a direction that is radial relative to the filter assembly. FIG. 4C illustrates a cross-section through the system of FIG. 4B.

As seen in FIG. 4A, a system 300 may include a container body 302, a lid body 310, and a filter assembly 324, which may be inserted from the top down (e.g., dropped down) into casing or shell 136, which includes slots 138. Filter assembly 324 may be trapped between a bottom of casing or shell 136 and lid body 310, upon insertion therein. For example, a top end of filter assembly 324 may snap into or otherwise be secured into lid body 310. A top end of shell 136 may be threaded, snapped, or similarly secured into lid body 310. In another embodiment, the filter assembly 324 could be screwed or similarly secured (e.g., snapped) into a bottom of shell 136, etc. An opening 334 not for exit of filtered water, but for insertion of filter assembly 324 may be provided (e.g., towards the forward end of) in lid body 310. Opening 334 is plugged or sealed upon insertion of filter assembly 324 into shell 136.

Filter assembly 324 may be similar to assembly 124 of FIG. 2A, e.g., including a core about which textile filter media material 126 is wrapped, providing a generally cylindrical shape. The top end 330 of filter assembly 324 may be somewhat differently configured than assembly 124, e.g., so as to provide for exit of filtered water in a radial or lateral direction, rather than coaxial with the longitudinal axis of the assembly 324. For example, within the interior of filter assembly 324, the top end 330 may be closed, while outlet 308 for exiting filtered water may be provided in a lateral side of top end 330 of filter assembly 324. A corresponding outlet portion 308a may also be provided in lid body 310, in-line with outlet 308 of filter assembly. So that filtered water exiting filter assembly 324 through outlet 308 then enters outlet portion 308a of lid body 310. A spout 314 may be inserted including another outlet portion 308b may be inserted and retained within outlet portion 308a, so that filtered water exiting outlet 308 flows through outlet portions 308a and 308b, then exiting the system 300.

Spout 314 may be configured (e.g., in cross-sectional area, other geometric characteristics, etc.) to serve as a flow control device, to regulate flow out of system 300 to a desired flow rate, as described herein. Spout 314 may redirect filtered water flow exiting axially from the filter assembly, and may control and ensure water exits along a guided flowpath. The interior pathway defined by spout 314 (e.g., outlet 308, 308a, and to 308b) may be tapered in cross-sectional area and/or width, narrowing towards exit 308b. Such a spout 314 has been found to be helpful in providing consistent flow rates over the volume of water dispensed by the container body (e.g., so that the flow rate when dispensing the first cup from a full container is substantially equal to the flow rate when dispensing the last cup from a nearly empty container. For example, flow rates may be within ±30%, ±25%, ±20%, ±10%, or ±5%, over the entire volume of the container. Additional details of such flow regulation are described in Application Ser. No. 15/039, 002, already incorporated by reference.

FIG. 4B illustrates a similar system 400 including a lid body 410 to which shell 136 may be secured. In the embodiment seen in FIG. 4B, filter assembly 424 may also be similarly configured to filter assembly 124, e.g., including a core about which textile filter media material 126 is wrapped, providing a generally cylindrical shape. Rather than being inserted from above as in FIG. 4A, the filter assembly 424 may be inserted into shell 136 from below. As shown, a top end 430 of filter assembly 424 may include threads 428 for threading filter cartridge 424 into corresponding grooves of lid body 410. Alternatively, top end 430 could snap into lid body 410. The bottom end 432 of filter assembly 424 may be provided with a ribbed outer surface to facilitate screwing of filter assembly 424 into lid body 410.

A spout 314 similar to that described in conjunction with FIG. 4A may also be provided, inserted within an outlet portion 308a in lid body 410, so that water exits system 400 through outlet 308b in a direction that is radial or lateral relative to the longitudinal axis of filter assembly 424 received within shell 136. For example, both FIGS. 4A and 4B illustrate configurations in which the water enters through an inlet 112 in a top of the lid body, but in which water exits the system in a lateral, perpendicular direction, rotated about 90° relative to inlet 112, rather than exhibiting an inlet and outlet that are parallel to one another (e.g., inlet 112 and outlet 108 of FIG. 1 are parallel to one another, while inlet 112 and outlet 308b of FIGS. 4A-4B are perpendicular to one another).

FIG. 4C shows a cross-sectional view through the assembled system 400 of FIG. 4B illustrating an exemplary flow path, similar to that shown in FIG. 3. The system 300 of FIG. 4A may include a similar flow path as that shown in FIG. 4C. As shown, unfiltered water may be introduced into container body 302 through inlet 112 (arrow A), flow into filter assembly 424 along a radial flow path as depicted by arrows B, through one or more layers of textile material filter media 126, which advantageously is disposed so as to present a curved, rather than perpendicular or planar surface to the stream of water. Once the water passes through layer(s) 126, the filtered water may then flow axially, as represented by arrows C, up towards outlet 308b. In order to exit outlet 308b, the filtered water is again turned, flowing laterally outward (arrow D). Before finally exiting outlet 308b, the filtered water may pass through any additional flow control device (e.g., a slit valve, grating, etc.) disposed adjacent the outlet.

Figure 5:
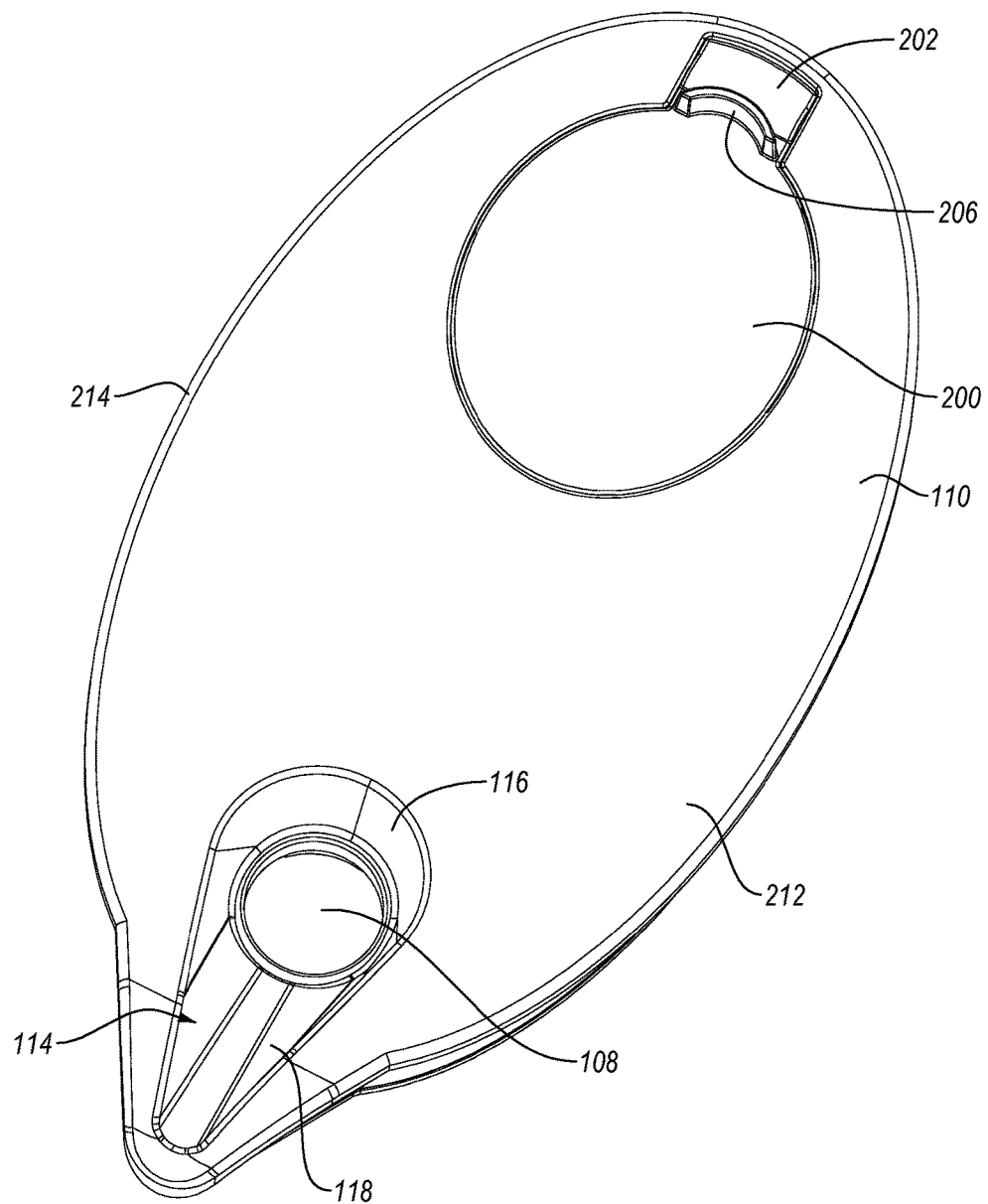
FIG. 5 is a top perspective view of a lid body for a filter-as-you-pour system.

FIG. 5 shows a top perspective view of an exemplary lid body 110. Visible is inlet cover 200, hinged joint 202, and raised lip 206. The lid body 110 is configured so that water poured from outlet 108 flows out of spout 114. The lid body 108 is shown as having a substantially oval shape that tapers and extends triangularly at spout 114, although it will be appreciated the lid body could be round, substantially triangular, substantially rectangular, other polygonal (including one or more curved sides), or any other suitable shape. The top surface 212 of lid body 110 is shown as substantially planar, except for the hinged joint 202, raised lip 206, outlet 108, and tapered spout portion 118.

Figure 6A:
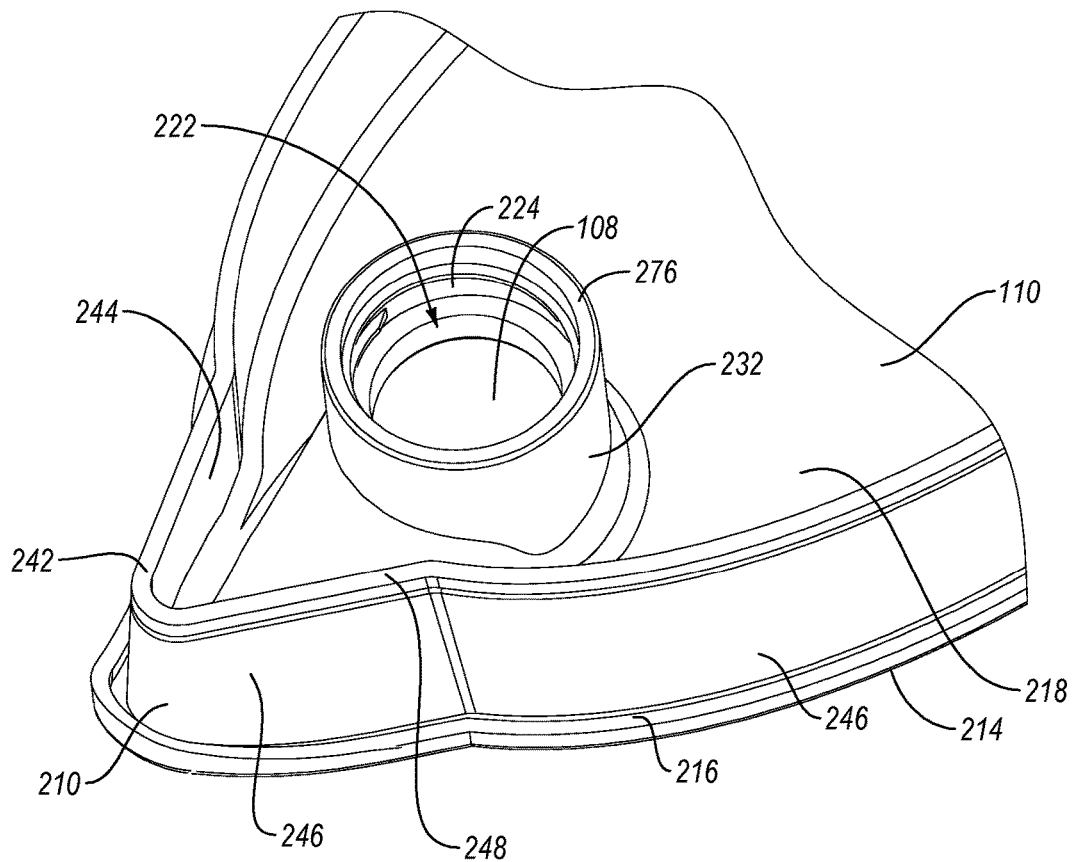
FIG. 6A is a bottom perspective view of the lid body of FIG. 5.
Figure 6B:
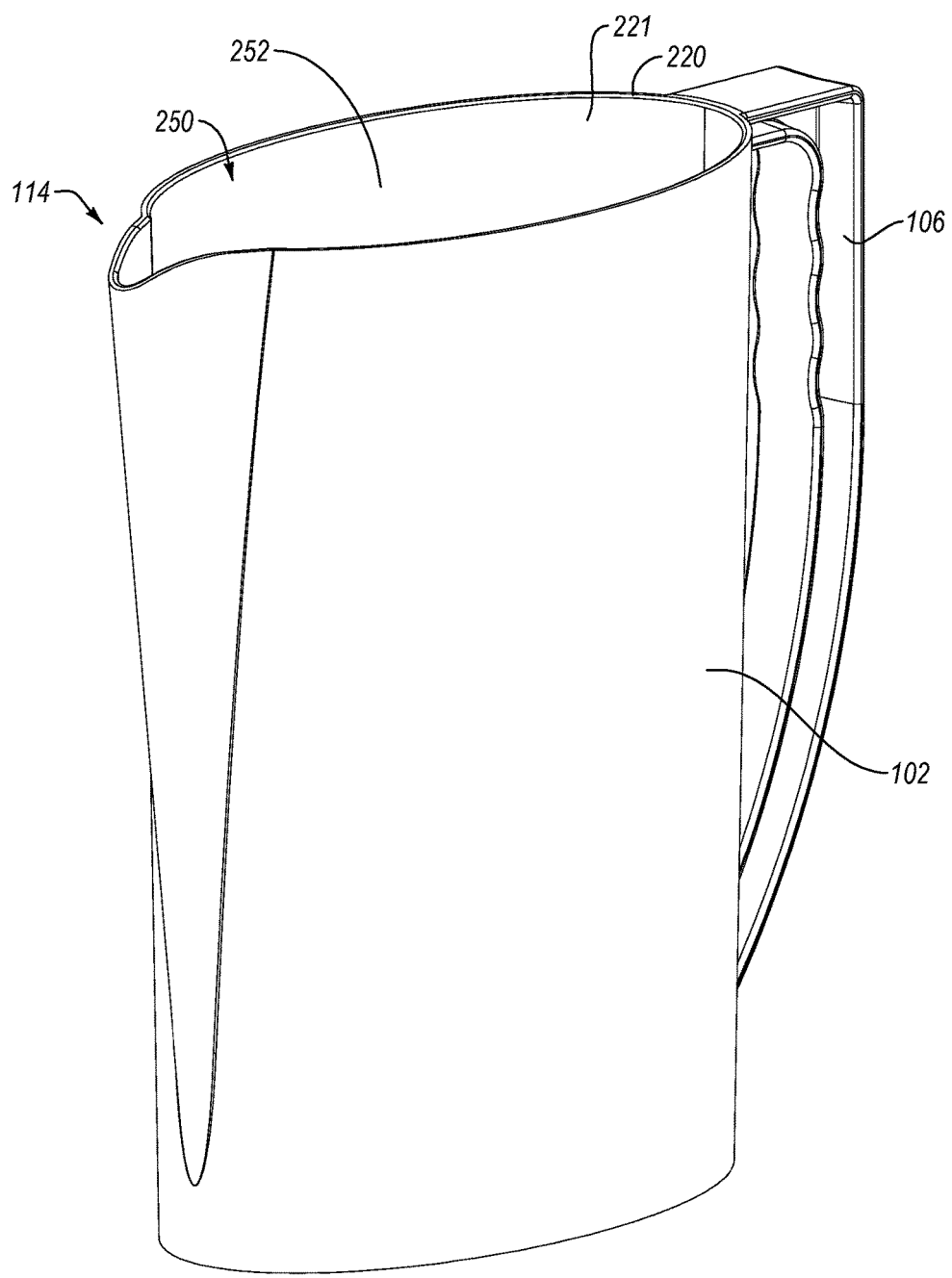
FIG. 6B is a perspective view of an exemplary container body for a filter-as-you-pour system.

As shown in FIGS. 6A and 6B, lid body 110 and container body 102 may comprise respective sets of complementary locking structures configured to releasably engage one another so that lid body 110 may be selectively and releasably attached to (e.g., over) container body 102.

FIG. 6A shows a bottom perspective view of lid body 110. The lid body 110 is shown as including a downwardly tapered lip 210 extending generally perpendicular from bottom surface 218. The downwardly tapered lip 210 may be generally perpendicular to the top surface 212 and bottom surface 218. The downwardly tapered lip 210 may extend around the entire outer perimeter edge 214 of the lid body 110. The downwardly tapered lip 210 may form a closed perimeter loop 242 concentric within outer edge 214 of lid body 110. The downwardly tapered lip 210 has an inner surface 244, an outer surface 246, and a bottom surface 248.

In the embodiment of FIG. 6A, the downwardly tapered lip 210 is slightly inset relative to outer edge 214 of the lid body 110, so that a portion 216 of bottom surface 218 of lid body 110 is located outside of the perimeter loop 242 defined by lip 210. In other words, the distance around loop 242 is slightly less than the distance around the outer edge 214 of the lid body 110. The inner surface 244 and outer surface 246 may each connect to the bottom surface 218 at substantially a 90° angle, e.g., slightly less than 90° between surface 244 and surface 218, and slightly more than 90° between surface 246 and surface 218 due to the tapering of lip 210. For example, these angles may deviate from perpendicular by about 5° or less.

The bottom surface 248 of the downwardly tapered lip 210 may be substantially perpendicular to both inner surface 244 and outer surface 246. Although illustrated with a downwardly tapered lip, it will be appreciated that in an embodiment, no taper may be provided, so that outer surface 246 may be vertical, without any offset or incline therefrom.

In another embodiment, outer edge 246 of the downwardly tapered lip 210 may be flush with outer edge 214, so that the distance around loop 242 may be substantially the same as the distance around the outer edge 214, and no portion of the bottom surface 218 extends outside of downwardly tapered lip 210.

The portion 216 of bottom surface 218 located outside of downwardly tapered lip 210 may correspond in dimensions and shape to top 220 of container body 102. When lid body 110 is placed on top of container body 102 (e.g., as seen in FIG. 1), there may be a friction fit between the downwardly tapered lip 210 of lid body 110 and the inner sidewall 252 of container 102, adjacent top 220. Outer portion 216 may rest on top of top 220. In other words, top end 250 of container body 102 may be approximately equal in shape and size to the corresponding portions of lid 110. Inner sidewall surface 252 may be substantially equal to the corresponding dimensions of the corresponding outer edge 246 of the downward lip 210, against which surface 252 frictionally engages, holding lid 110 over container body 102. This friction fit structure of lid body 110 and container body 102 are an example of complementary locking structures.

The surfaces at which outer edge 246 of the downwardly tapered lip 210 and portion 216 of the bottom surface 218 may touch the top end 250 inner surface 252 when friction fitted to one another. Inner surface 252 of the container body 102 may be grooved, ribbed, or have other textures that facilitate locking between the container body 102 and lid body 110 as lid body 110 is placed over the open top of container body 102. One or more of these surfaces may also comprise a material that is assists with gripping the other surfaces, such as a rubber, silicone, or other elastomeric material.

Figure 6C:
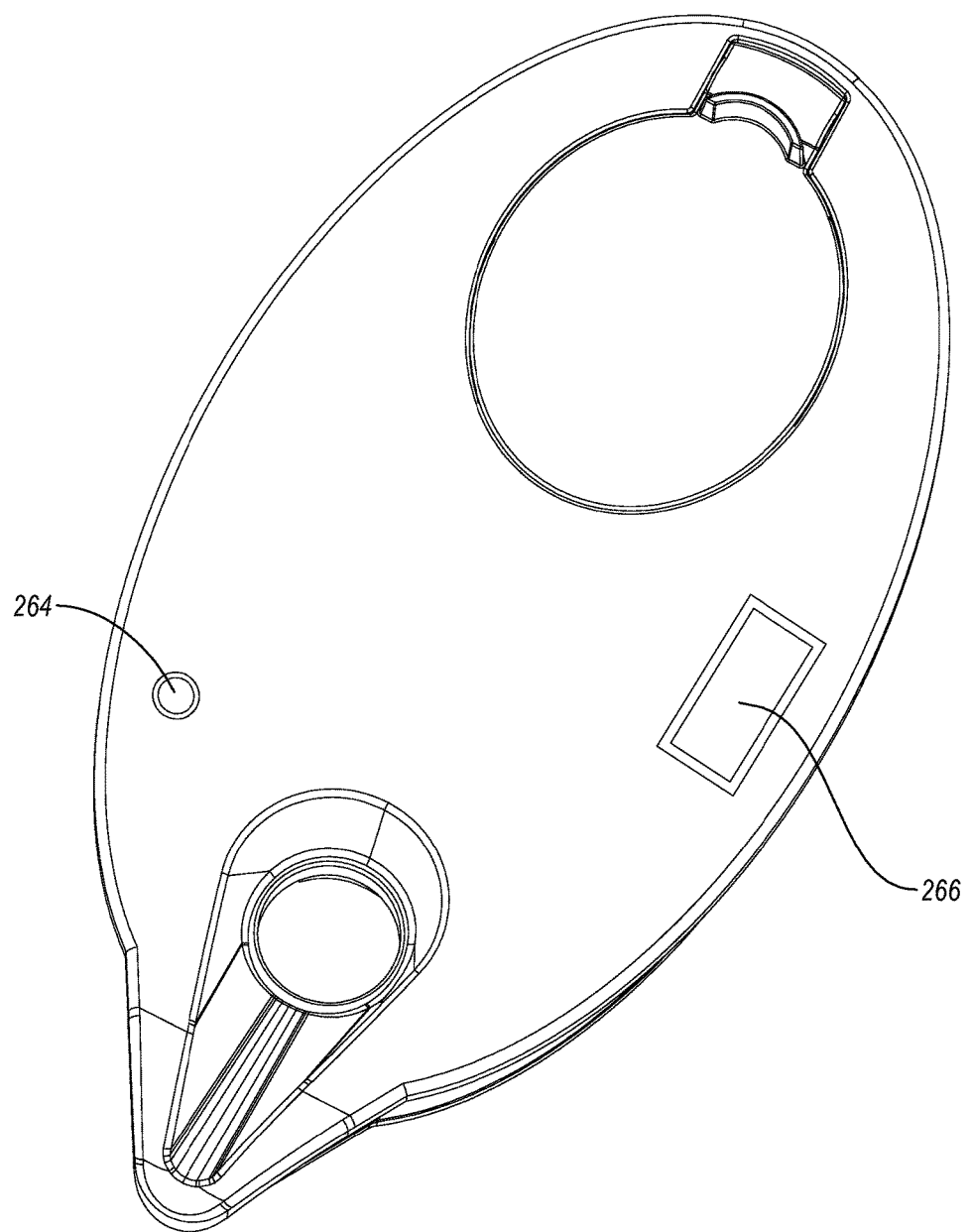
FIG. 6C is a top perspective view of another lid body for a filter-as-you-pour system.

As shown in FIG. 6C, there may be a latch, button, or other mechanism 266 (e.g., disposed on lid 110, or container body 102) that helps users separate lid body 110 from container body 102. Pressing a button 266 may cause a force to be exerted against the inner surface 252 of the container body 102. By pushing the button 266, the friction fit or other locking means may be overcome more easily.

If there is no latch, button or other mechanism to assist with separating lid body 110 from container body 102, it may be preferable that the complementary locking structures do not fit together so tightly that it is too difficult for users to separate the lid body 110 from the container body 102 when they are locked together.

Figure 6D:
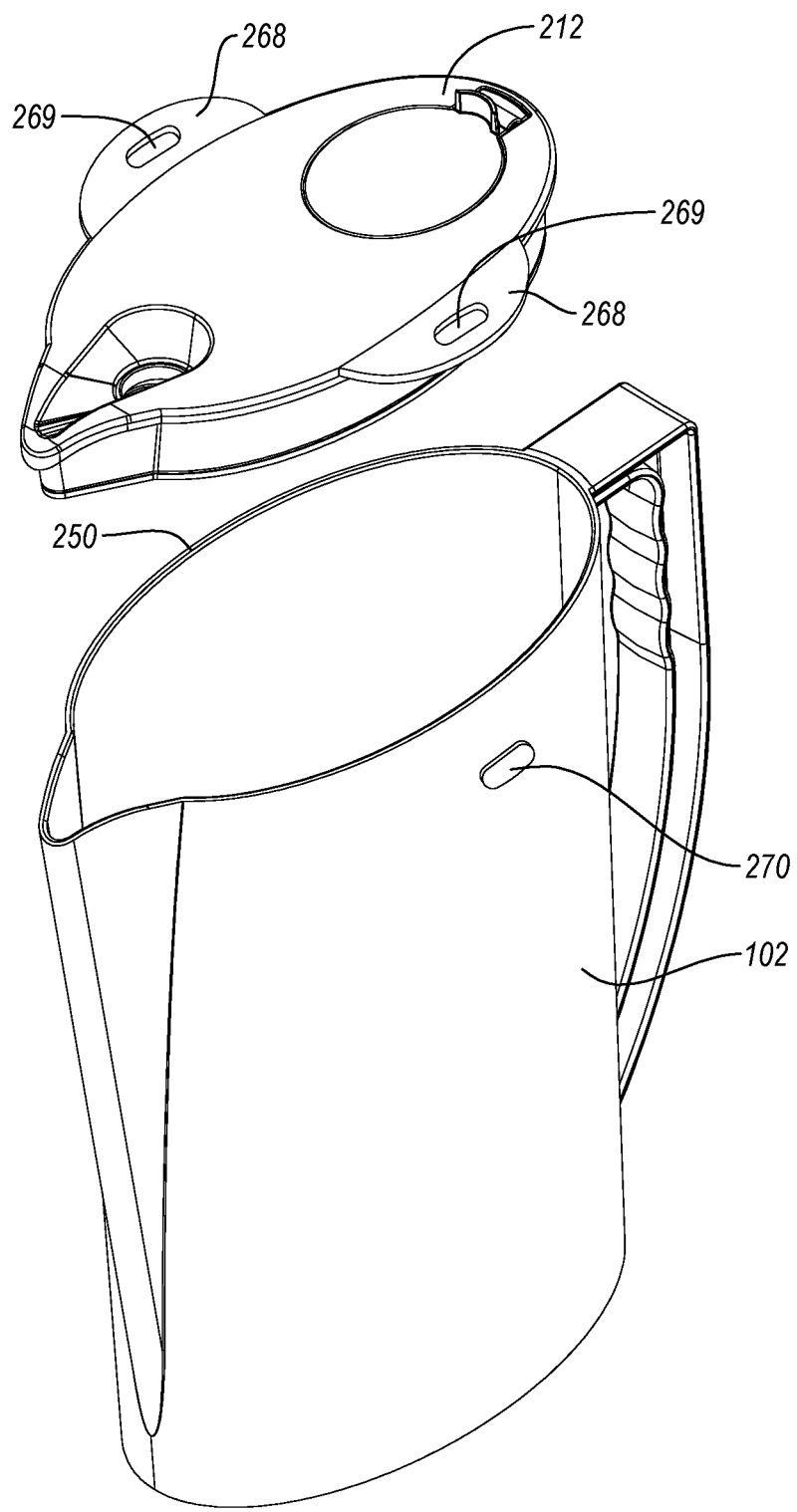
FIG. 6D is an exploded perspective view of another embodiment of a lid body and container body illustrating another example of complementary locking structures.

As shown in FIG. 6D, the locking means may comprise one or more locking members 268 located on container lid 110 with a corresponding ridge 270 located on the container body 102. The locking members 268 may connect to the top surface 212 of lid body 110.

The locking members 268 may include a recess 269 corresponding to ridge 270, so as to snap onto the ridge 270 to lock the lid body 110 onto the container body 102. When snapped over ridge 270, ridge 270 may be received within recess 269. Corresponding locking members 268 and ridges 270 may be provided on opposed sides of container body 102. The lid body 110 may be easily removed from container body 102 by pulling the locking members 268 away from ridges 270 and then lifting up lid body 110. Various other complementary locking structures between the lid body and container body may be employed.

Referring again to FIG. 6A, a filter connection location 222 may be disposed on the bottom surface 218 of the lid body 110. The filter connection location 222 is shown as a ring-shaped coupling structure 232 that is located directly below outlet 108. The ring-shaped coupling structure 232 has grooves 224 in the embodiment shown in FIG. 6A. The grooves 224 of the filter connection location 222 are sized and oriented to fit with corresponding threads 226 on core 128 of filter assembly 124. As shown in FIGS. 2A and 2B, threads 226 of filter assembly 124 may be located on the outside of a cylindrical neck 228 at a top end 230 of filter assembly 124. By providing grooves 224 in coupling ring 232 and corresponding threads 226 on filter assembly 124, filter assembly 124 may be securely screwed into lid body 110, and unscrewed if filter assembly 124 needs to be replaced.

In another embodiment employing a thread and groove connection, the threads may be formed on the inside of coupling ring 232, and corresponding grooves formed into the exterior surface at the top of cylinder 228. In another embodiment, the threads or grooves associated with outlet 108 of lid body 110 could be disposed on an exterior surface of coupling ring 232, and the corresponding threads or grooves of filter assembly 124 could be disposed on an interior surface of the top end 230 of the filter assembly, so that the filter assembly is releasably attachable over and about (e.g., surrounding) the coupling ring 232 corresponding to outlet 108.

Figure 7A:
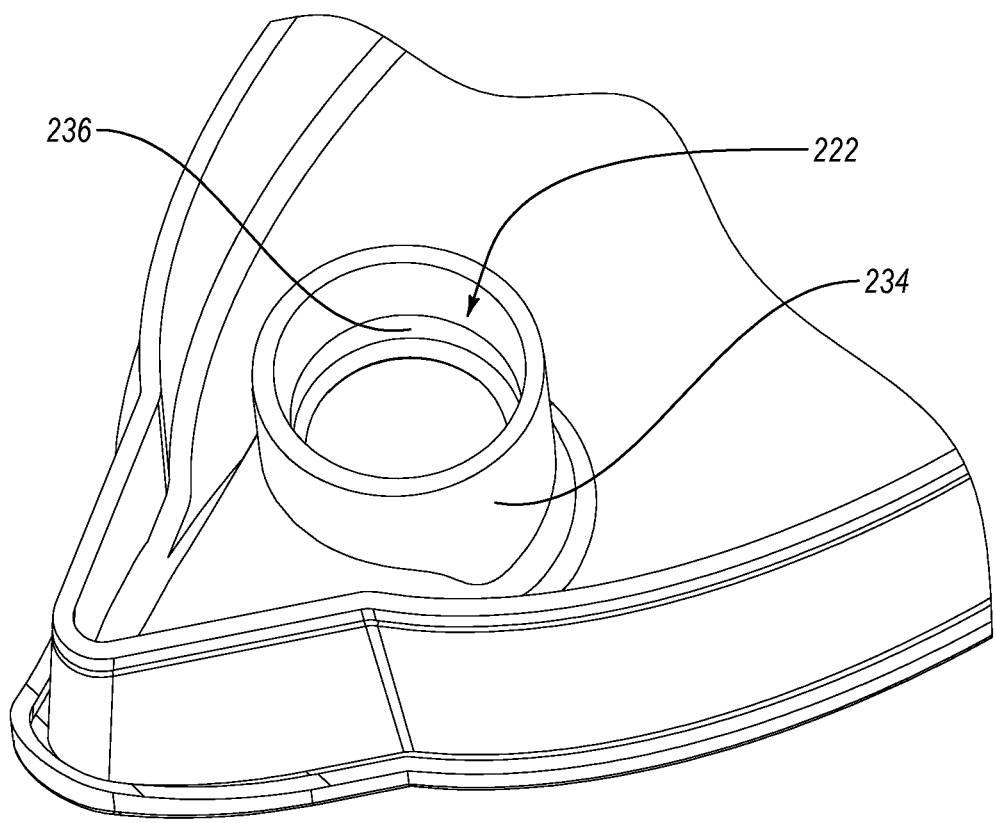
FIG. 7A is bottom perspective view of another embodiment of a lid body for a filter-as-you-pour system.
Figure 7B:
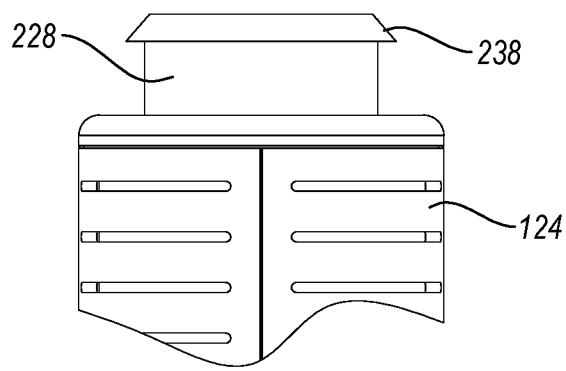
FIG. 7B illustrates another embodiment of a filter assembly for use with the lid body of FIG. 7A.

In another embodiment shown at FIGS. 7A and 7B, the filter connection location 222 comprises a flexible ring-shaped coupling structure 234 that has an inwardly extending annular groove 236. The filter assembly 124 may include a corresponding an outwardly extending lip 238. When the filter assembly 124 is placed up against the flexible ring-shaped coupling structure 234 of the filter connection location 222, the flexible ring-shaped coupling structure 234 may slightly expand to accommodate passage of the outwardly extending lip 238. Once lip 238 passes over groove 236, it may snap outwardly, being matingly received therein, so as to hold the filter assembly 124 in place.

Figure 7C:
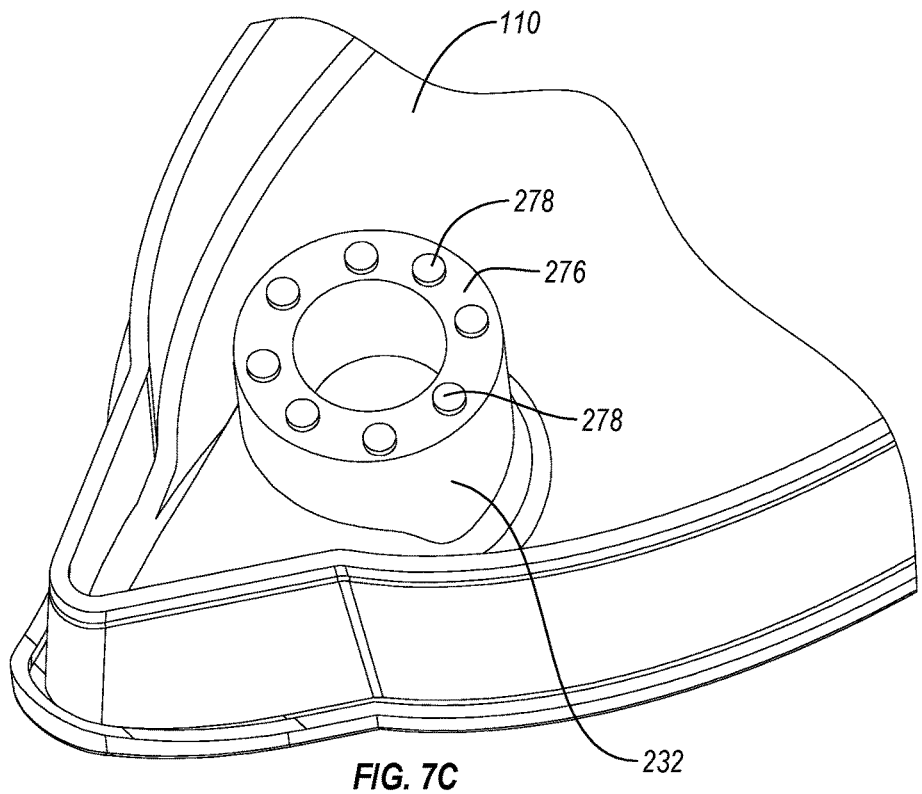
FIG. 7C shows another exemplary embodiment of a lid body for a filter-as-you-pour system.
Figure 7D:
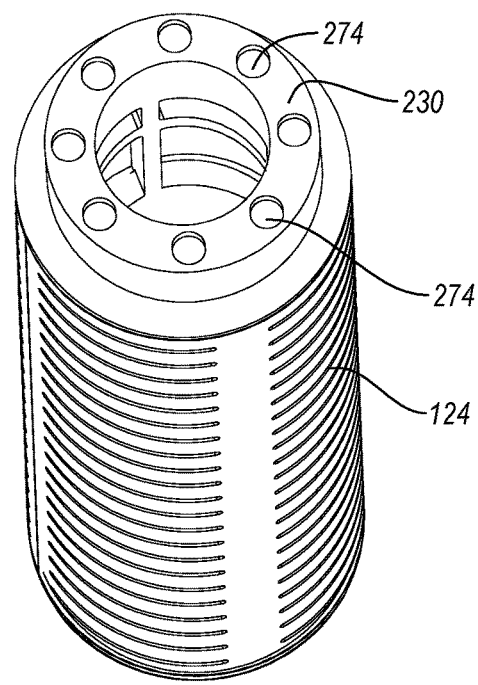
FIG. 7D is a perspective view of another embodiment of a filter assembly for use with the lid body of FIG. 7C.

In another embodiment, shown in FIGS. 7C and 7D, the filter assembly 124 may have a plurality of circular recesses 274 located on its top end 230. The bottom end 276 of the ring-shaped coupling structure 232 of the lid body 110 may have repeating plurality of protrusions 278 sized to fit and be retained within the circular holes 274 (e.g., similar to the mechanism of a LEGO brick). The depth and diameter of the protrusions 278 and the height and diameter of the recesses 274 are configured so that when the circular protrusions 278 are engaged in the recesses 274, they fit firmly, but the circular protrusions 278 can be easily separated from the holes 274, when desired. This prevents inadvertent decoupling of filter assembly 124 from lid body 110, but allows easy removal therefrom when desired.

Figure 8A:
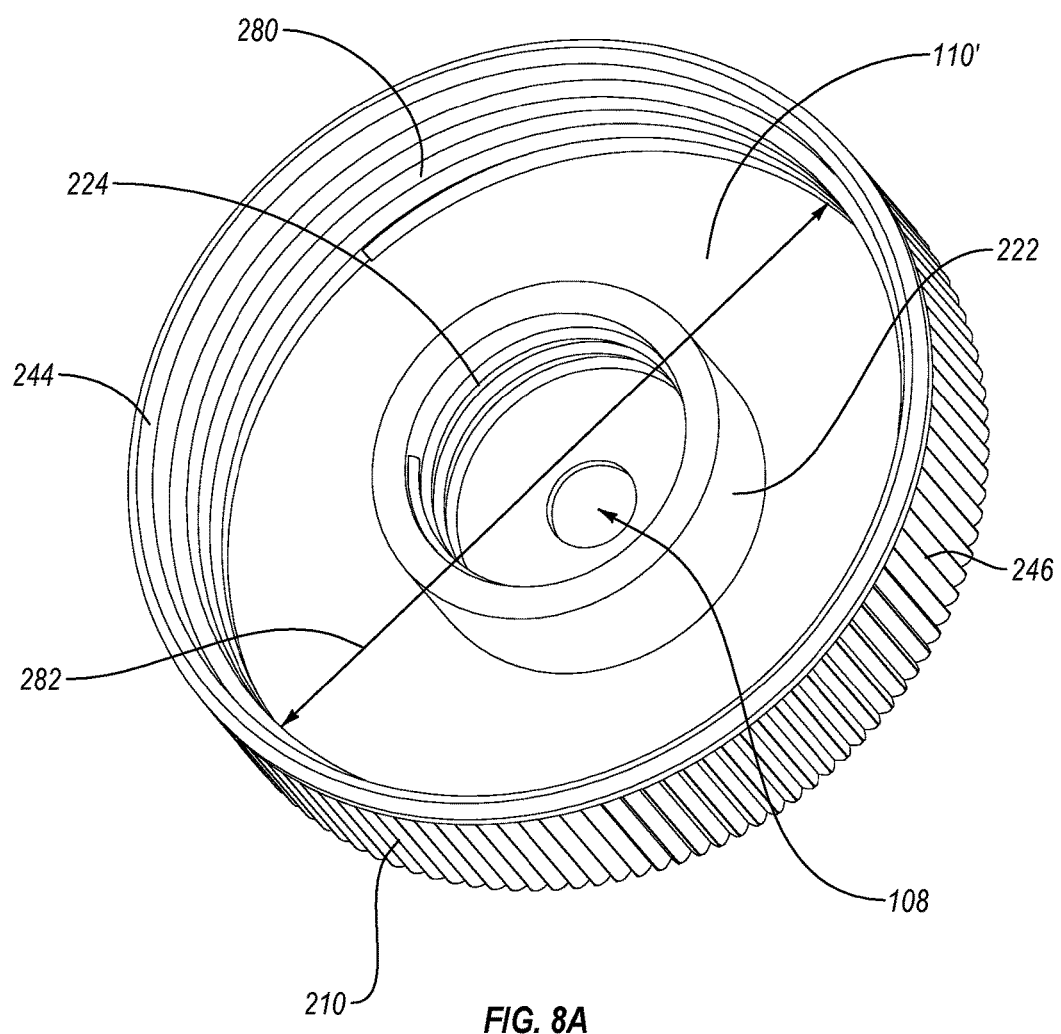
FIG. 8A is a perspective view of another embodiment of a lid body.
Figure 8B:
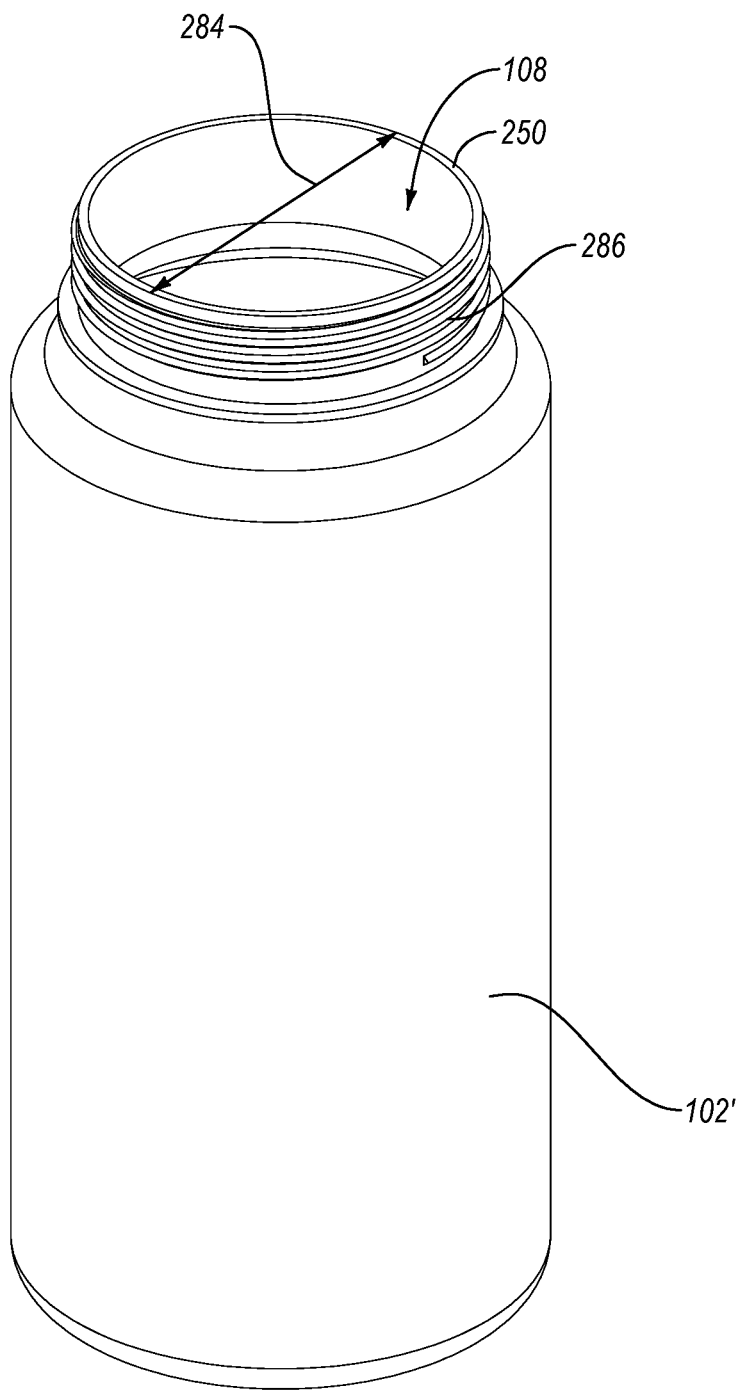
FIG. 8B is a perspective view of an embodiment of a container body for a filter-as-you-pour system configured as a water bottle.

FIGS. 8A-8B show another configuration for a lid body, and a corresponding container body, including means for attaching the lid body 110' to the container body 102'. FIG. 8A shows a circular lid body 110'. The lid body 110' has grooves 280 in the inner surface 244 of downward facing lip 210, which is illustrated as ridged on its outer surface 246. FIG. 8B shows a container body 102'. Its top end 250 and outlet is also circular, and includes threads 286 on its outer surface, near top end 250. The diameter 282 of lid body 110' may generally correspond to the diameter 284 of the container body 102, so as to allow lid body 110' to be screwed over container body 102'.

The threads 286 and corresponding grooves 280 may be configured to complement each other so that by screwing the round lid body 110' onto the round opening of container body 102', the lid body 110' and container body 102' may be firmly attached together. This structure of the lid body 110' and container body 102' are another example of complementary locking structures.

One or more of the surfaces by which coupling is achieved at filter connection location 222 may be textured that facilitate locking between the container body and the lid body. One or more of these surfaces may comprise a material that is assists with gripping the other surfaces, such as a rubber, silicone, or other elastomeric material.

It will be appreciated that the container body 102' and lid body 110' of FIGS. 8A-8B represents an example of a container system in which the inlet and outlet 108 may be one and the same. In other words, unfiltered water may be introduced into the system through the same single opening 108, as through which filtered exits. In such an embodiment, the filter assembly (e.g., 124—see FIG. 2A) coupled into location 222 proximate inlet/outlet 108 may serve as a dual pass filter, such that water enters the system through combined inlet/outlet 108, axially enters filter 124 in a direction and location aligned with its longitudinal axis, and then exits filter assembly 124 radially through textile filter media material 126, and slots 138, entering container 102'. Upon exit from container body 102' the path is reversed, following the same flow regimen described above in conjunction with FIG. 3, by which reentry into the filter assembly 124 is in a radial direction, through slots 138 and textile material 126. Once in the central longitudinal portion, flow is axial, towards combined inlet/outlet 108.

In an embodiment, the filter assembly and lid body may include means for indicating that the lid body and filter assembly have been correctly connected together (i.e., so as to prevent water from bypassing the filter assembly). For example, the means for indicating that the lid body 110 and filter assembly 124 have been correctly connected together may be a light that illuminates (or goes off) upon correct connection (e.g., closing (or opening) an electrical circuit upon correct connection), the providing of an indicator color upon correct connection, or other indicator. For example, differently colored portions of the lid body 110 and filter assembly 124 may be provided, which upon alignment and correct connection with one another form a third color, or differently textured or patterned portions of the lid body and filter assembly which upon alignment and correct connection with one another form a third texture or pattern. In another embodiment, the means for indicating correct connection may be an auditory signal (e.g., a snapping sound, etc.) indicating that the filter assembly has been correctly connected with the lid body.

FIGS. 9A-9B illustrates one such embodiment. For example, the ring-shaped coupling structure 232 has cross-hatching 260 that represents a first color (e.g., cyan), and the filter assembly 124 has cross-hatching 262 that represents a second color (e.g., magenta). As shown in FIG. 9B, when cyan portion 260 of the filter connection point 222 is properly connected to magenta portion 262 of the filter assembly 124, the color blue may be formed, which is represented by cross-hatching 269. Thus, a user can know that the filter assembly 124 is correctly coupled into the filter connection location 222 because of the formation of the third color. Other color combinations may also be used, e.g., blue and yellow to make green, or blue and red to make purple, etc.

In another embodiment, the cross-hatching 260 may represent a pattern or design, such as stripes, checks, polka dots, etc. The cross-hatching 262 may also represent a pattern or design, so that when the filter assembly 124 is correctly placed into the filter connection point 222, a new pattern 269 is formed, or a word, symbol, or character becomes visible. The placement and nature of the designs or patterns 262 and 260 would be configured so that the new pattern 269, word, or symbol only is formed or becomes visible when the filter assembly 124 is correctly connected to the filter connection point 222, so that users can know when the filter assembly 124 is correctly connected.

In another embodiment, there may be a light 264 on the lid body 110 or the container body that illuminates (or goes off) when the filter assembly 124 is connected or disconnected from the filter connection location 222. Such a configuration is shown in FIG. 6C. The light 264 may go out when the filter assembly 124 is correctly connected to the ring-shaped structure 232, so that a user has a visible indication that the two are correctly connected. In another embodiment, the light 264 may instead illuminate when the filter assembly 124 is correctly connected to the filter connection point 222, and turn off when the filter assembly 124 is disconnected from the filter connection point 222. Such a light or other indicator may similarly be provided after a period of time, indicating to the user that it is time to replace the filter cartridge (e.g., after 3 months, or a certain volume of water has been filtered, etc.).

Visual or other indicators (e.g., color, lights, sound, etc.) as described above provided to aid the user in easily knowing when the filter assembly is correctly connected to the lid body may similarly be provided with the complementary locking structures provided to lock the lid body to the container body, e.g., a color indicator signifying that the lid is properly attached over the container body.

Various other features of exemplary systems may be disclosed in one or more of the following patent applications, each filed the same day as the present application and herein incorporated by reference: Application Ser. NOs. 14/569,397; 15/038,996; 15/038,998; 15/039,002; 15/039,008; and 15/039,012. Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A filter-as-you-pour system, the system comprising:
a container body having a container wall defining an internal storage volume;
a lid body that is releasably attachable over the container body, the lid body having a main surface and a side wall extending from the main surface;
an outlet for water to flow out of the system;
an inlet through the lid body through which unfiltered water may be introduced into the internal storage volume of the container body while the system is assembled; and
an elongated filter assembly attachable to the lid body, the filter assembly having an inner core frame member surrounded by a textile filter media and a shell sandwiching the textile filter media between the inner core frame and the shell to present a curved surface of the textile filter media to the unfiltered water, wherein when attached to the lid body, the filter assembly being disposed so as to be in a flow stream of the water only as the water is poured out of the container body through the outlet so that the stream of water exiting through the outlet is filtered as it is poured from the container body, so that all water exiting through the outlet passes through the filter assembly before exiting through the outlet;
where the lid body is releasably attachable to the filter assembly through complementary locking structures of the lid body and the filter assembly so that the lid body may be selectively and releasably attached to the filter assembly.

2. The system of claim 1, where the textile filter media of the filter assembly comprises an activated carbon textile material that presents the curved surface to the flow stream of water.

3. The system of claim 1, wherein the shell includes slots configured to enable water to flow into the filter assembly from the container body in a radial direction toward a longitudinal axis of the filter assembly, and flow out towards the outlet in an axial direction.

4. The system of claim 3, where wherein the filter assembly is configured to enable water to flow into the filter assembly at an outer perimeter of the filter assembly, and flow out of the filter assembly along a longitudinal axis of the filter assembly.

5. The system of claim 3, wherein the outlet of the system is formed through the side wall of the lid body and oriented laterally relative to a longitudinal axis of the filter assembly, so that the water flows into the filter assembly in a first radial direction toward the longitudinal axis of the filter assembly, flows out towards the outlet in a second radial direction away from the longitudinal axis of the filter assembly, and finally flows out the outlet in a single lateral direction relative to and away from the longitudinal axis of the filter assembly.

6. The system of claim 1, where the system is configured to provide a minimum flow rate of 0.3 gallons per minute.

7. The system of claim 1, where the lid body and the container body each respectively comprise complementary locking structures configured to releasably engage one another so that the lid body may be selectively and releasably attached to the container body.

8. The system of claim 1, where the outlet is disposed in the lid body, and wherein the filter assembly screws into the lid body at a location within or surrounding the outlet.

9. The system of claim 1, where the filter assembly and lid body include means for indicating that the lid body and filter assembly have been correctly connected together so as to prevent water from bypassing the filter assembly.

10. The system of claim 9, where the means for indicating that the lid body and filter assembly have been correctly connected together is selected from the group consisting of: (i) a light that illuminates or goes off upon correct connection; (ii) differently colored portions of the lid body and filter assembly which upon alignment and correct connection with one another form a third color; (iii) differently textured or patterned portions of the lid body and filter assembly which upon alignment and correct connection with one another form a third texture or pattern; (iv) an auditory signal provided upon correct connection; and (v) combinations thereof.

11. The system of claim 1, wherein the filter assembly is attached to the lid body by way of a plurality of protrusions extending from one of the lid body or the filter assembly that are sized to fit and be retained within a plurality of recesses in the other of the lid body or filter assembly such that when the plurality of protrusions are engaged in the plurality of recesses they are configured to firmly fit together.

12. The system of claim 1, wherein the lid body includes a first indicia indicating member and the filter assembly includes a second indicia indicating member, wherein upon the filter assembly being correctly connected to the lid body, a third indicia is formed by the first and second indicia indicating members.

13. The system of claim 1, wherein the inlet in the lid body is configured to allow water to be introduced into the internal storage volume of the container body along a first axis, the filter assembly is configured to allow the water to radially pass through the filter assembly toward a longitudinal axis of the filter assembly, flow along the longitudinal axis and radially out of the filter away from the longitudinal axis through the outlet in the container body in a direction substantially perpendicular to the first axis.

14. A filter-as-you-pour system, the system comprising:
a container body defining an internal storage volume;
a lid body comprising an outlet through which filtered water is poured out of the container body and an inlet through which water is introduced into the container body, the lid body being releasably attachable to the container body; and
an elongated filter assembly configured to releasably attach to the lid body around the outlet of the lid body, the filter assembly having an inner core frame member surrounded by a textile filter media and a shell sandwiching the textile filter media between the inner core frame and the shell to present a curved surface of the textile filter media to unfiltered water, wherein when attached to the lid body, all water flowing through the outlet passes through the filter assembly before passing through the outlet as water is poured out of the container body;
where the lid body is configured so that water introduced into the container body through the inlet flows directly into the container body without first flowing through a filter or a reservoir while the system, including the container body, lid body, and filter assembly, are assembled; and
where the lid body and the container body comprise respective sets of complementary locking structures configured to releasably engage one another so that the lid body may be selectively and releasably attached to the container body.

15. The system of claim 14, where the textile filter media of the filter assembly comprises an activated carbon textile material that presents the curved surface to a flow stream of water.

16. The system of claim 14, wherein the shell includes slots configured to enable water to flow into the filter assembly from the container body in a radial direction toward a longitudinal axis of the filter assembly, and flow out of the filter towards the outlet in an axial direction.

17. The system of claim 14, where the system is configured to provide a minimum flow rate of 0.3 gallons per minute.

18. The system of claim 14, where the filter assembly and lid body include means for indicating that the lid body and filter assembly have been correctly connected together so as to prevent water from bypassing the filter assembly.

19. The system of claim 18, where the means for indicating that the lid body and filter assembly have been correctly connected together is selected from the group consisting of: (i) a light that illuminates or goes off upon correct connection; (ii) differently colored portions of the lid body and filter assembly which upon alignment and correct connection with one another form a third color; (iii) differently textured or patterned portions of the lid body and filter assembly which upon alignment and correct connection with one another form a third texture or pattern; (iv) an auditory signal provided upon correct connection; and (v) combinations thereof.

20. The system of claim 14, wherein the outlet of the lid body through which filtered water is poured out of the container body and the inlet of the container body through which water is introduced into the container body, are generally perpendicular to one another.

21. A filter-as-you-pour system, the system comprising:
a container body having a wall defining an internal storage volume;
a filter assembly having an inner core frame member surrounded by a textile filter media and a shell sandwiching the textile filter media between the inner core frame and the shell to present a curved surface of the textile filter media to unfiltered water;
a lid body that is directly attachable to the filter assembly;
the lid body comprising an outlet through which filtered water is poured out of the container body and an inlet through which water is introduced into the container body;
where the lid body and system are configured so that water flows directly into the inlet and into the container body without first flowing through a filter or a reservoir while the system, including the container body, lid body, and filter assembly, are assembled; and
the filter assembly being directly attachable to the lid body and disposed about the outlet so that all water flowing through the outlet passes through the filter assembly before passing through the outlet in the lid as water is poured out of the container body.

22. The system of claim 21, where the textile filter media of the filter assembly comprises an activated carbon textile material that presents the curved surface to a flow stream of water.

23. The system of claim 21, wherein the shell includes slots configured to enable water to flow into the filter assembly from the container body in a first radial direction toward a longitudinal axis of the filter assembly, flow out towards the outlet in an axial direction along the longitudinal axis, and flow out the outlet in a second radial direction away from the longitudinal axis in a single lateral direction.

* * * * *